US010016013B2

(12) United States Patent
Kormann et al.

(10) Patent No.: US 10,016,013 B2
(45) Date of Patent: Jul. 10, 2018

(54) ADDITIVE MANUFACTURED METAL SPORTS PERFORMANCE FOOTWEAR COMPONENTS

(71) Applicant: adidas AG, Herzogenaurach (DE)

(72) Inventors: Marco Kormann, Herzogenaurach (DE); Justin Thomas Steeds, Herzogenaurach (DE); Fionn Jonathan Corcoran-Tadd, Herzogenaurach (DE); Daniel Stephen Price, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 113 days.

(21) Appl. No.: 14/835,213

(22) Filed: Aug. 25, 2015

(65) Prior Publication Data

US 2016/0051009 A1 Feb. 25, 2016

(30) Foreign Application Priority Data

Aug. 25, 2014 (DE) .................. 10 2014 216 859

(51) Int. Cl.
*A43B 13/10* (2006.01)
*A43B 1/08* (2006.01)
(Continued)

(52) U.S. Cl.
CPC .............. *A43B 13/10* (2013.01); *A43B 1/08* (2013.01); *A43B 5/00* (2013.01); *A43B 5/08* (2013.01);
(Continued)

(58) Field of Classification Search
CPC ........... A43B 13/10; A43B 13/14; A43B 1/08; A43B 5/00; A43B 5/08; A43B 5/14; A43B 3/1055; A43B 7/1415
See application file for complete search history.

(56) References Cited

U.S. PATENT DOCUMENTS 4,297,796 A * 11/1981 Stirtz .................. A43B 13/18
36/28
4,535,553 A * 8/1985 Derderian ............ A43B 13/181
36/28
(Continued)

FOREIGN PATENT DOCUMENTS

CN 1629455 9/2006
CN 101404905 4/2009
(Continued)

OTHER PUBLICATIONS

German Patent Application No. 102014216859.7, Office Action dated Jul. 21, 2015, 7 pages (No English translation available. A summary of the Office Action is provided in the Transmittal Letter submitted herewith).
(Continued)

*Primary Examiner* — Jila M Mohandesi
(74) *Attorney, Agent, or Firm* — Kilpatrick Townsend & Stockton LLP

(57) ABSTRACT

The present invention relates to a sole (100; 200) for a shoe (300), in particular for a cycling shoe (300), comprising: (a.) a three-dimensionally shaped rim (110); and (b.) a plurality of first reinforcing struts (121-127; 221-222), wherein (c.) at least two (122-125; 221-222) of the plurality of first reinforcing struts (121-127; 221-222) extend from a heel region (112) of the rim (110) of the sole (100; 200) to a toe region (115) of the rim (110) of the sole (100; 200), and wherein (d.) the rim (110) of the sole (100; 200) and the plurality of first reinforcing struts (121-127; 221-222) are integrally manufactured as a single piece in an additive manufacturing process.

29 Claims, 20 Drawing Sheets

(51) Int. Cl.
  *A43B 13/14* (2006.01)
  *A43B 5/00* (2006.01)
  *A43B 7/14* (2006.01)
  *B22F 3/105* (2006.01)
  *A43B 5/14* (2006.01)
  *A43B 5/08* (2006.01)
  *B33Y 10/00* (2015.01)
  *B33Y 80/00* (2015.01)

(52) U.S. Cl.
  CPC .............. *A43B 5/14* (2013.01); *A43B 7/1415* (2013.01); *A43B 13/14* (2013.01); *B22F 3/1055* (2013.01); *B33Y 10/00* (2014.12); *B33Y 80/00* (2014.12)

(56) References Cited

U.S. PATENT DOCUMENTS

| | | | | |
|---|---|---|---|---|
| 5,337,492 | A | * | 8/1994 | Anderie ............... A43B 13/183 36/114 |
| 5,461,801 | A | | 10/1995 | Anderton |
| 6,763,611 | B1 | | 7/2004 | Fusco et al. |
| 8,151,488 | B2 | * | 4/2012 | Aveni ............... A41D 19/01547 36/11.5 |
| 9,320,316 | B2 | * | 4/2016 | Guyan ................. A43B 13/127 |
| 9,433,256 | B2 | * | 9/2016 | Callahan ............... A43B 3/0057 |
| 2010/0154257 | A1 | | 6/2010 | Bosomworth et al. |
| 2013/0139412 | A1 | | 6/2013 | Auger et al. |
| 2014/0182170 | A1 | * | 7/2014 | Wawrousek ............. A43B 7/14 36/103 |

FOREIGN PATENT DOCUMENTS

| | | |
|---|---|---|
| CN | 103338670 | 10/2013 |
| DE | 9205917 | 8/1992 |
| DE | 102007027054 | 12/2008 |
| GB | 1511296 | 5/1978 |
| JP | 2001340101 | 12/2001 |
| WO | 2013171339 | 11/2013 |
| WO | 2014008331 | 1/2014 |
| WO | 2014066172 | 5/2014 |
| WO | 2014066173 | 5/2014 |
| WO | 2014066174 | 5/2014 |
| WO | 2014100462 | 6/2014 |

OTHER PUBLICATIONS

European Patent Application No. 15182319, Search Report dated Feb. 2, 2016, 7 pages.
Chinese Application No. 201510526897.6, Office Action dated Nov. 2, 2016, 8 pages (No English translation available. A summary of the Office Action is provided in the Transmittal Letter submitted herewith).
Chinese Application No. 201510526897.6, Office Action dated Dec. 15, 2017, 15 pages (8 pages of English translation and 7 pages of original document).

* cited by examiner

ADDITIVE MANUFACTURED METAL SPORTS PERFORMANCE FOOTWEAR COMPONENTS

CROSS REFERENCE TO RELATED APPLICATION

This application is related to and claims priority benefits from German Patent Application No. DE 10 2014 216 859.7, filed on Aug. 25, 2014, entitled Additive Manufactured Metal Sports Performance Footwear Components ("the '859 application"). The '859 application is hereby incorporated herein in its entirety by this reference.

FIELD OF THE INVENTION

The present invention relates to a sole for a shoe, in particular to a sole or a portion of a sole for a shoe, as well as a cycling shoe with such a sole.

BACKGROUND

The design of a shoe sole provides a shoe with a plethora of different properties and characteristics. An important property of the shoe that may be influenced by its sole is the bending stiffness. This is particularly important for a cycling shoe, such as a cycling shoe for road cycling, mountain biking, cyclocross, triathlon, downhill, etc.

A bicycle and its rider are propelled forward by the forces the rider transmits via his feet to the pedals of the bicycle. These forces are then further transmitted from the pedals through the crankset and the drivetrain system to drive the rear wheel of the bicycle. In order to facilitate an efficient transmission of the forces exerted by the rider from his feet to the pedals, a cycling shoe and, in particular, its sole should provide a high amount of bending stiffness. Otherwise, the sole might deform under the high forces exerted by the rider, leading to an undesirable energy loss and preventing the rider from making efficient use of his muscle power. Also, the foot of the rider and, in particular, the arch of the rider's foot may be more susceptible to injuries, e.g. by overstraining the arch of the foot, if the sole of the shoe does not offer sufficient support.

These aspects are not only relevant for cycling shoes, but concern other sports shoes as well, like those for field sports, running, football, basketball, American football, outdoor sport, etc. Also with these exemplarily mentioned kinds of sports it is very important to ensure a proper transmission of forces between the foot of a wearer and the ground, while at the same time providing support for the foot.

Soles of conventional cycling shoes, for example, therefore often contain sole plates made from, for example, a carbon fiber material to provide the desired stiffness to the sole. However, such carbon fiber plates increase the weight of the shoe if a high degree of stiffness is desired and also prevent sufficient ventilation of the foot. Moreover, they may be difficult to adapt to the anatomy of the sole of a rider's foot, such that a customization of the shoe sole, for example to avoid chaffing or pressure points, may not be possible or only be possible to a limited degree.

Recently, additive manufacturing methods, such as selective laser sintering, have been considered for providing customized three-dimensional objects. For example in the WO 2014/100462 A1 devices and methods for designing and manufacturing customized footwear are discussed. More specifically, the footwear may be customized for different athletic activities including cycling. This document also discloses that selective laser sintering could be used for the manufacture of the footwear.

Further documents discussing the use of additive manufacturing methods like laser sintering in relation to shoes are WO 2014/066172 A1, WO 2014/066173 A1, WO 2014/066174 A1 or WO 2014/008331 A2.

However, the sintered soles known from the prior art may have the disadvantage that they do not sufficiently take into account the anatomy of the feet of future wearers and may not be optimally geared towards the specific circumstances and requirements with respect to the desired direct transmission of forces from the feet of a rider to the pedals of a bicycle as discussed above.

It is therefore a problem underlying the present invention to provide improved soles for shoes, which at least partly overcome the above disadvantages. In particular, improved soles for cycling shoes are needed, that are light-weight and that allow sufficient ventilation and a customization to the anatomy of the feet of a wearer, while at the same time providing a sufficient bending stiffness and support to the feet of the wearer to ensure the desired direct transmission of forces from the feet to the pedals of a bicycle.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a sole for a shoe comprises a three-dimensionally shaped rim, and a plurality of first reinforcing struts, wherein at least two of the plurality of first reinforcing struts extend from a heel region of the rim of the sole to a toe region of the rim of the sole, and wherein the rim of the sole and the plurality of first reinforcing struts are integrally manufactured as a single piece.

In some embodiments, the plurality of first reinforcing struts cannot be decoupled from the rim of the sole without destruction of one of the plurality of first reinforcing struts and the rim of the sole.

In certain embodiments, at least one of the plurality of first reinforcing struts that extend from the heel region of the rim to the toe region of the rim extends in a smooth S-shape from the heel region of the rim across a bottom side of the sole to the toe region of the rim. The at least two of the plurality of first reinforcing struts that extend from the heel region of the rim to the toe region of the rim may extend essentially parallel and each in a smooth S-shape from the heel region of the rim across the bottom side of the sole to the toe region of the rim. The plurality of first reinforcing struts may provide a first reinforcing layer of the sole. In some embodiments, a plurality of second reinforcing struts integrally manufactured with the rim and the plurality of first reinforcing struts and providing a second reinforcing layer. At least one of the first reinforcing struts in the first reinforcing layer may be essentially parallel to at least one of the corresponding second reinforcing struts in the second reinforcing layer.

In some embodiments, two adjacent first reinforcing struts and their corresponding essentially parallel second reinforcing struts are interconnected by a plurality of nodes.

The plurality of nodes may comprise an X-shaped cross-sectional form in at least one of: a bottom view, a rear view and a side view of the sole. The plurality of nodes may further comprise the X-shaped cross-sectional form in all three views.

The sole may further comprise a lattice structure integrally manufactured with the rim, the plurality of first reinforcing struts, and the plurality of second reinforcing struts as a single piece. The lattice structure may be sandwiched between the plurality of first reinforcing struts and the plurality of second reinforcing struts. The lattice structure may further comprise a plurality of nodes.

In some embodiments, the lattice structure comprises a plurality of second nodes and wherein the plurality of first reinforcing struts and the plurality of second reinforcing struts are positioned on the lattice structure between adjacent ones of the plurality of second nodes. The plurality of nodes and the plurality of second nodes may be offset, such that the plurality of first reinforcing struts and the plurality of second reinforcing struts are offset from the plurality of nodes.

The sole may further comprise an attachment mechanism for coupling a cleat to the bottom side of the sole, which is integrally formed with the at least one of the first reinforcing struts or the second reinforcing struts.

In some embodiments, the sole further comprises at least one first bumper element in at least one of the toe region and the heel region, wherein the at least one first bumper is arranged between at least two adjacent first reinforcing struts or two adjacent second reinforcing struts and protruding downwardly from the bottom side of the sole. The sole may further comprise at least one second bumper element attached to the bottom side of at least one of the plurality of first reinforcing struts.

In some embodiments, at least one of the first or second reinforcing struts comprises a T-shaped cross-section. The rim may be three-dimensionally shaped to support an arch region of a wearer's foot when worn.

In some embodiments, the sole comprises a bending stiffness greater than 40 N/mm in the heel region. The sole may further comprise a bending stiffness greater than 220 N/mm in the toe region. The sole may also comprise a weight smaller than 100 g.

According to certain embodiments of the present invention, a sole for a shoe comprises a three-dimensionally shaped rim, and a plurality of first reinforcing struts, wherein at least one of the plurality of first reinforcing struts extends from a heel region of the rim of the sole to a toe region of the rim of the sole, and wherein the rim of the sole and the plurality of first reinforcing struts are formed of a metal material laser sintered as a single piece. In some embodiments, the metal material comprises AlSi10 Mg, 239 and/or Ti6Al4 V.

According to some embodiments, a shoe comprises a sole as described above. The shoe may further comprise an upper attached to the three-dimensionally shaped rim. The shoe may also further comprise a net or a membrane arranged on the top side of the sole.

In some embodiments, a heel portion extends around an ankle of a wearer's foot towards an instep of the foot when worn to allow securing the foot within the shoe.

The shoe may further comprise a sockliner, wherein the sockliner comprises a woven material layer comprising carbon fibers.

According to certain embodiments of the method of manufacturing a three-dimensionally shaped rim a plurality of first reinforcing struts, wherein at least one of the plurality of first reinforcing struts extends from a heel region of the rim of the sole to a toe region of the rim of the sole, the method comprising utilizing an additive manufacturing process to integrally form the rim of the sole and the plurality of first reinforcing struts.

According to certain embodiments of the present invention, a method of manufacturing a three-dimensionally shaped rim comprises providing an electronic data file comprising at least one design for a three-dimensionally shaped rim comprising a plurality of first reinforcing struts, constructing the three-dimensionally shaped rim comprising a plurality of first reinforcing struts using an additive manufacturing method, and post-process treating the three-dimensionally shaped rim comprising a plurality of first reinforcing struts. In some embodiments, the electronic data file is a CAD file.

BRIEF DESCRIPTION OF THE DRAWINGS

In the following detailed description, embodiments of the invention are described referring to the following figures.

BRIEF DESCRIPTION

Figure 1A:
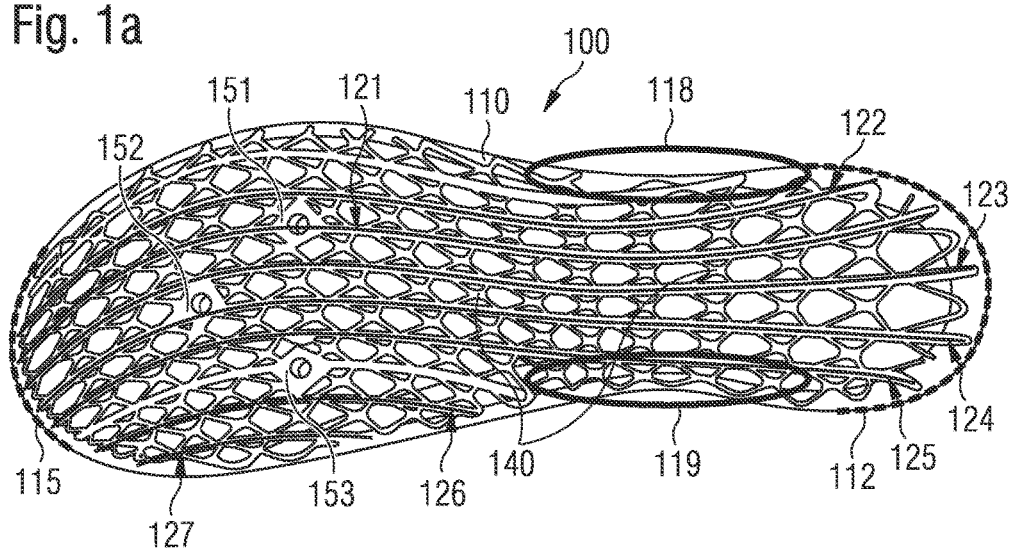
FIGS. 1a-g are bottom and perspective views of a shoe sole, according to certain embodiments of the present invention.

According to an aspect of the invention, this problem is at least partially solved by a sole for a shoe, in particular a sole for a cycling shoe, with a three-dimensionally shaped rim and a plurality of first reinforcing struts, wherein at least two of the plurality of first reinforcing struts extend from a heel region of the rim of the sole to a toe region of the rim of the sole, and wherein the rim of the sole and the plurality of first reinforcing struts are further integrally manufactured as a single piece in an additive manufacturing process.

By providing a three-dimensional shaped rim, in contrast to a simple flat rim, the rim may be adapted to the form of the foot of a wearer and thus provide a kind of stability frame for the sole. This may provide the desired support to the foot of the wearer and prevent or delay fatigue and overstraining of the foot muscles. The three-dimensionally shaped rim may also facilitate attachment of an upper to the sole.

Through use of the plurality of first reinforcing struts, the sole can be provided with the desired bending stiffness. From the plurality of first reinforcing struts, at least two extend from the heel region of the rim to the toe region of the rim such that a high bending stiffness along the entire length of the sole can be provided. Furthermore, since more than one first reinforcing strut extend along the length of the sole, also the torsional stiffness of the sole can be increased.

By integrally manufacturing the rim of the sole and the plurality of first reinforcing struts as a single piece in an additive manufacturing process, a very durable and stiff sole can be provided. The use of an additive manufacturing process further allows customization of the sole to the individual anatomy of the foot of a future wearer. Integrally manufacturing the rim of the sole and the plurality of first reinforcing struts as a single piece does not exclude that other portions of the sole may be created using other manufacturing processes including other 3D manufacturing processes.

In the following, further design possibilities and optional features of such an inventive sole are described, which may be combined as desired by the skilled person to achieve the respective desired effect on the properties of the sole.

For example, it is possible that at least one of the first reinforcing struts that extend from the heel region of the rim to the toe region of the rim extends in a smooth S-shape from the heel region of the rim across a bottom side of the sole to the toe region of the rim.

By extending in a smooth S-shape across the bottom side of the sole, the respective first reinforcing strut can follow the natural "flow lines" or anatomy of the sole of the foot of a wearer and it can furthermore beneficially influence the side stability of the sole with regard to lateral/medial forces and its torsion stiffness compared to a straight reinforcing strut.

When talking about the bottom side of the sole, this generally refers to the side of the sole facing away from the wearer's foot and facing towards the ground or the pedal of a bicycle. A strut is referred to as comprising an S-shape, if it comprises at least one inflection point where the curvature of the strut changes its orientation. That is, a shape in form of a "mirrored S", for example, may also be referred to as an S-shape within this document. Furthermore, a smooth S-shape is an S-shape without any pronounced kinks, edges or more generally sudden and pronounced changes of direction.

It is furthermore possible that at least two of the first reinforcing struts that extend from the heel region of the rim to the toe region of the rim extend essentially parallel and each in a smooth S-shape from the heel region of the rim across the bottom side of the sole to the toe region of the rim.

In this manner, the above-mentioned beneficially influence on the side stability of the sole and its torsion stiffness can be developed in an even more pronounced manner and the wearing comfort of the sole can be further increased.

When talking about the first reinforcing struts extending "essentially parallel" from the heel region of the rim across the bottom side of the sole to the toe region of the rim, this means that the distance between two such respective first reinforcing struts only changes very marginally compared to the length of the two reinforcing struts. In particular, in the heel region or the toe region of the sole, two such essentially parallel first reinforcing struts may also deviate from being perfectly parallel in a mathematical sense, however. They may, for example, slightly converge or diverge in these regions within typical manufacturing tolerances.

In further embodiments, the plurality of first reinforcing struts provides a first reinforcing layer of the sole.

By providing a reinforcing layer, the sideward stability of the sole may be further increased. Also, a good connection, for example, with a pedal of the bicycle may be achieved. Such a reinforcing layer, in particular when constituting the bottom side of the sole, may also prevent a rider of a bicycle from twisting his ankle when he steps of his bicycle and walks, for example, on a road.

The sole may further comprise a plurality of second reinforcing struts integrally manufactured with the rest of the sole in the additive manufacturing process and providing a second reinforcing layer.

Through the provision of such a second reinforcing layer, the stability of the sole and in particular its bending stiffness may be further increased. Also, the thickness of the sole may be increased in this way, such that the danger of incurring any injuries when treading, for example, on pointed objects on the ground may be decreased. Also, heat insulation may be improved when walking on cold ground. The provision of such a second reinforcing layer may, for example, also lead to a better ventilation of the foot and thus to an improved wearing comfort.

In the sole, at least one of the first reinforcing struts in the first reinforcing layer may be essentially parallel to at least one of the corresponding second reinforcing struts in the second reinforcing layer.

In this manner, good ventilation of the foot may be maintained, since between the parallel first and second reinforcing struts, ventilation openings may be provided. Also, as further described below, additional sole elements may be arranged between the "walls" formed by respective pairs of parallel first and second reinforcing struts. Such additional sole elements may be anchored within the two reinforcing layers of the sole in a very stable manner, in particular with respect to leverage forces acting on them.

Generally speaking, two or more reinforcing struts may be interconnected by a plurality of nodes. More specifically, it is in particular possible that two adjacent first reinforcing struts and their corresponding essentially parallel second reinforcing struts are interconnected by a plurality of nodes.

Through application of such nodes, the overall stability of the sole may be further increased. This applies, in particular, to shearing forces, torsional forces, and bending forces acting on the sole. Further, by the construction of the sole with first and second reinforcing struts interconnected by such nodes, a very lightweight and breathable sole may be provided.

The nodes may comprise an X-shaped cross-sectional form in at least one of: a bottom view, a rear view and a side view of the sole. In particular, the nodes may comprise an X-shaped cross-sectional form in all three views.

Nodes with an X-shaped cross-sectional form can distribute forces acting on the sole in a largely isotropic manner and thus lead to a stabilization of the sole with regard to any forces acting in a direction within the plane in which the cross-section is taken. For the case that the nodes comprise an X-shaped cross-sectional form in all three of the above-mentioned views, this effect is particularly strongly pronounced, i.e. the sole comprises highly isotropic stability characteristics with regard to forces acting in any dimension of space.

When talking about the bottom view, rear view and side view of the sole, this is intended to mean a view of the sole in the worn state, i.e. when the sole is mounted on a shoe and the shoe is worn by the wearer.

The sole may further comprise a lattice structure integrally manufactured with the rim, the plurality of first reinforcing struts and the plurality of second reinforcing struts as a single piece in an additive manufacturing process. The lattice structure may be sandwiched between the plurality of first reinforcing struts and the plurality of second reinforcing. The lattice structure may comprise the plurality of nodes.

The lattice structure may add to the overall stability of the sole and may in particular increase the bending stiffness of the sole while at the same time reduce its weight. In this way, the weight may be lower, yet the bending stiffness may be higher compared, for example, to a sole made from carbon fibers.

The lattice structure may comprise a plurality of second nodes while the plurality of first reinforcing struts and the plurality of second reinforcing struts are positioned on the lattice between adjacent ones of the second nodes. The nodes and the second nodes may be offset, such that the plurality of first reinforcing struts and the plurality of second reinforcing struts are offset from the nodes. In this way, the bending forces acting on the sole may be diverted in an optimal way while saving material and weight.

The sole may further comprise an attachment mechanism for attaching a cleat to the bottom side of the sole, which may be integrally formed with the first and/or second reinforcing struts in certain embodiments.

In particular for cycling shoes, such cleats are often used to effect a force-fit connection between the shoe of a rider and the pedal of his bicycle in order to allow the best possible transmission of forces from the foot to the pedal. It also allows the rider not only to push down on the pedal during the first half of a full pedal revolution, but also to pull up the pedal with his foot during the second half of the pedal revolution. By integrally forming the attachment mechanism or fastener to the bottom side of the sole, the attachment mechanism or fastener can be anchored within the sole in a particularly durable and stable manner.

It is possible that the sole further comprises at least one first bumper element in the toe region and/or in the heel region. Bumper elements may be arranged between two adjacent first reinforcing struts and/or two adjacent second reinforcing struts and protrude downwardly from the bottom side of the sole. The at least one bumper may be connected directly to at least one of the first reinforcing struts. Alternatively or in addition, the at least one bumper may be connected to a backing plate. In general, the at least on bumper is connected to the sole.

Such a first bumper element can serve the purpose of increasing the grip of the sole, for example, on a road on which a rider of a bicycle may step upon dismounting his bicycle and thus prevent the rider from slipping or twisting his ankle. It may also, more generally, increase the wearing comfort of such a shoe when used during normal walking. By arranging such a first bumper element between two adjacent first and/or second reinforcing struts, it may also be possible to exchange the first bumper element when it has worn off. To this end, such a first bumper element may, for example, be provided in such a manner, that it may snap into place between the adjacent first and/or second reinforcing struts. This may also allow taking the first bumper off when it is not needed, for example to save weight during cycling.

It is also possible that the sole further comprises at least one second bumper element attached to the bottom side of at least one of the first reinforcing struts.

Such a second bumper element may, for example, be molded onto the respective first reinforcing strut, it may be integrally formed with the respective first reinforcing strut or it may manually be clipped onto or otherwise attached to the respective first reinforcing strut. The last option may again have the benefit that the second bumper element may be taken off when it has worn off or is not needed, for example during cycling.

In general, the mentioned at least one first or second bumper element may be a chemically bonded bumper, an over-injected bumper, at least one coated sole element (e.g. one or more raised struts), a mechanically bonded bumper (e.g. push-fit, press-fit, interference fit, snap-fit), etc.

In certain embodiments, at least one of the first or second reinforcing struts comprises a T-shaped cross-section, but it may have another geometry as well.

A T-shaped cross-section may allow providing a first or second reinforcing strut with a very high bending stiffness with regard to its longitudinal axis, with only a reduced amount of material being necessary. Hence, weight may be saved without compromising the stability and bending stiffness of the sole by providing first or second reinforcing struts with the T-shaped cross-section.

More generally, it is mentioned here that an individual strut, both from the plurality of first reinforcing struts or the plurality of second reinforcing struts, may vary in its thickness, stiffness, cross-sectional form, etc. along its length and such characteristics may also differ between different struts of the plurality of first reinforcing struts or the plurality of second reinforcing struts, respectively, and also between the two sets or pluralities of struts.

The rim may, in particular, be three-dimensionally shaped to support the arch region of the foot.

The arch of the foot is a particularly sensitive region of the foot and, in particular, during long rides on the bicycle may be susceptible to fatigue, overstraining and even injuries. By providing a three-dimensional shaped rim in such a manner that it supports the arch region of the foot, such fatigue and overstraining may be avoided, the wearing comfort may be increased, maximum transmission of the forces from the foot of the wearer to the pedal of the bicycle may be facilitated, and the endurance of the athlete may be increased.

It is possible that the additive manufacturing process comprises a laser sintering of a metal material.

Laser sintering is particularly well suited for the manufacture of shoe soles with a high bending stiffness, since sintered metal may comprise a very high stability and stiffness. At the same time, laser sintering is a well-developed manufacturing procedure that allows the manufacture also of complex three-dimensionally shaped parts at comparatively low costs. Herein, the metal material may comprise, for example, AlSi10 Mg, 239 and/or Ti6Al4 V and in general any alloy from a metal, e.g. Al, Ti, Mg, Fe, stainless steel, etc.

In the context of the present invention, materials like ceramic, polymers, a printed composite and a combination of two or more additively manufactured materials may be used as well.

On one side, the materials mentioned above are well known in the industry and are well suited for the manufacture of complex three-dimensionally shaped parts. On the other hand, they also meet the requirements for a shoe sole as described herein. In particular, they may be used for the manufacture of a lightweight, breathable and highly stable sole with a high bending stiffness. They are also environmentally harmless and do not pose any threat to the well-being of the wearer of such a sole.

The sole may comprise a bending stiffness that differs depending on the location of the measurement. On a cycling plate bending stiffness may, for example, be measured proximate a heel region and/or a toe region as disclosed herein. When measured as described herein on a standard 8.5 UK sized cycling plate, a bending stiffness at the heel region of an aluminum cycling plate may be greater than 40 N/mm. Further, the bending stiffness of the aluminum cycling plate measured at the toe region may be greater than 220 N/mm. In general, the bending stiffness may be different for a sole plate for a different kind of sports shoe (e.g. other than cycling).

These values have turned out beneficial in the sense that they allow the desired direct transmission of forces from the foot of the wearer to the pedal of the bicycle. At the same time they lie within the range that may be achieved by, for example, laser sintering with one of the above mentioned materials and the above-described constructions.

Depending on materials and design adjustments cycling plates constructed using additive manufacturing, such as laser sintering may have a reduced weight when compared to an equivalent conventionally constructed sole plate. For example, laser sintered sole plates for a cycling shoe may have a weight less than 150 grams for a standard UK size 8.5. In some cases, the weight of a whole laser sintered sole plate may be less than 130 grams. Moreover, the sole may comprise a weight of less than 100 grams. Some examples of a laser sintered sole plate may have a weight of less than 70 grams for a standard UK size 8.5. In general, the weight may be different for a sole plate for a different kind of sports shoe (e.g. other than cycling). Such a very lightweight sole can improve endurance of an athlete or of a recreational rider of a bicycle.

A further aspect of the present invention is provided by a shoe, in particular cycling shoe, with a sole as disclosed herein.

Such a shoe may be particularly light-weight, breathable and generally well suited for cycling, in particular since it allows a direct transmission of the rider's muscle power through his feet to the pedals of the bicycle, as already discussed herein, through the high bending stiffness of the sole of the shoe. Also, since the sole is manufactured in an additive manufacturing process, the sole may be customized to the foot of the wearer. Such a customization may also be extended to the upper and potential further parts of such a shoe, to further increase its fit and hence promote endurance and well-being of the wearer.

Further design possibilities and optional features of such inventive shoes are described in the following which may be combined as desired by the skilled person to achieve the respective desired effect on the properties of such a shoe.

The shoe may comprise an upper attached to the three-dimensionally shaped rim of the sole.

By attaching the upper to the three-dimensional shaped rim of the sole, additional parts may be avoided, such that the weight of the shoe can be kept low. At the same time, the complete shoe may be very stable and provide good fixation of the foot within the shoe. This again can promote the desired direct transmission of forces from the foot to the pedal and also help preventing injuries like, for example, the twisting of an ankle, and so forth.

It is also possible that the shoe further comprises a net or a membrane arranged on the top side of the sole.

Such a net or membrane can, for example, prevent dirt, water or pointed objects from entering the shoe through the sole. It may also serve decorative purposes, for example, to hide a sockliner or the foot of the wearer from being visible from the outside through openings in the sole. It can also increase heat insulation of the shoe if for example the shoe is intended to be worn primarily during cold seasons.

The upper of the shoe may, in particular, comprise a heel portion manufactured from a range of textile materials.

A good fixation of the heel of the foot is of particular importance, in particular during cycling, since a slipping of the heel may cause discomfort or even blisters and also impair maximum transmission of forces from the foot to the pedal. By using a material which provides a very high stability while having a very low weight, a stable fixation of the foot of the wearer within the shoe may be achieved while keeping the overall weight of the shoe very low.

It is possible that the heel portion with the material extends around the ankle of the foot towards the instep of the foot to allow securing the foot within the shoe.

By extending the heel portion around the ankle and towards the instep of the foot, for example to the region of the closure (e.g. lacing) system of the shoe, the foot of the wearer may be secured within the shoe even better and further weight may be saved. Also, a homogeneous look of the heel and midfoot part of the upper may be achieved.

Moreover, the shoe may further comprise a sockliner. Such a sockliner may provide a certain "softness" to the shoe, in order to increase for example the wearing comfort without impairing the bending stiffness of the sole. By providing a composite or multilayer sockliner, the sockliner can have a very high tear strength and it may also further protect the foot of the wearer from injuries, in particular from pointed objects entering the shoe and may also distribute any possible pressure points created by the structure of the sole plate.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention are described in the following detailed description with reference to soles and shoes for cycling. It is, however, emphasized that the present invention is not limited to this.

Rather, the present invention may also advantageously be employed in components, soles and/or shoes of a different kind where stiffness is important, for all sport segments including, but not limited to running, training, football, basketball, outdoor, sports inspired and fashion segments, etc. Further, in some shoes a partial sole constructed using additive manufacturing may be used rather than a complete sole structure.

It is also mentioned that in the following only individual embodiments of the invention can be described in more detail. The skilled person will realize, however, that the features and design options described in relation to these specific embodiments may also be modified or combined in a different manner within the scope of the invention, and that individual features may also be omitted if these seem dispensable in a given case. To avoid redundancies, reference is therefore in particular made to the explanations in the preceding section 3. ("Summary of the invention") which also apply for the following detailed description.

FIGS. 1a-g show an embodiment of an inventive sole 100 for a shoe, in particular for cycling shoe like, for example, the shoe 300 shown in FIGS. 4a-g.

The sole 100 comprises a three-dimensionally shaped rim 110. The rim 110 is three-dimensionally shaped in such a manner that it follows the natural anatomy of the edge of the foot and thus provides a stability frame on which the foot may rest. In particular, in the lateral midfoot region 118 and medial midfoot region 119, the rim 110 is three-dimensionally shaped to support the arch region of the foot, in order to avoid an overstraining of this region during a long bicycle ride, or the like.

The sole 100 also comprises a plurality of first reinforcing struts 121-127, which are integrally manufactured with the rim 110 as a single piece in an additive manufacturing process and which form a first reinforcing layer of the sole 100. In the present case, this first reinforcing layer comprising the plurality of first reinforcing struts 121-127 constitutes the bottom side of the sole 100 shown in FIGS. 1a, b, d and f. In FIGS. 1c, e and g, the bottom side of the sole 100 is facing towards the top of the respective figure.

The additive manufacturing process may, for example, comprise the laser sintering of a metal material. For the case shown here, an aluminum alloy, specifically AlSi10 Mg, 239 was used as metal material for the laser sintering of the sole 100. A metal material comprising Ti6Al4 V, for example, might also be used. In general, materials used may include metals such as aluminum, titanium, steel (e.g., maraging steel, stainless steel) or the like, alloys such as aluminum alloys (e.g., AlSiMg), titanium alloys (e.g., Ti64, Ti6AlV4), cobalt chrome alloys (e.g., CC MP1), nickel alloys (e.g., IN718, NiCr19Fe19NbMo3), super-alloys, composites, thermoplastics, thermosets, and/or combinations thereof.

Of the plurality of first reinforcing struts, the first reinforcing struts 122-125 extend from a heel region 112 of the rim 110 to a toe region 115 of the rim 110. The heel region 112 of the rim 110 may, for example, extend around the heel end of the sole 100 approximately up to the point where the ankle bone is located. The toe region 115 of the rim 110 may be located in front of the toes and up to the first toe joint of the medial and lateral toe, respectively.

The first reinforcing struts 121, 126 and 127, on the other hand, do not extend from the heel region 112 of the rim 110 to the toe region 115 of the rim 110. The first reinforcing struts 126 and 127 only start in the midfoot region of the sole 100. The first reinforcing strut 121, arranged between the first reinforcing struts 122 and 123, on the other hand, is intercepted by an attachment mechanism 151 (cf. below) for attaching a cleat to the bottom side of the sole 100 and hence divided into two subsections.

The first reinforcing struts 122-125, however, extend in a continuous smooth S-shape across the bottom side of the sole 100, i.e. they are in particular not divided into separate subsections, for example by other elements of the sole 100, and they do not contain any pronounced kinks or edges. To be more precise, in the case shown here, the first reinforcing struts 122-125 curve towards the lateral side of the sole 100 in the midfoot region and then "change direction" and curve towards the medial side of the sole in the forefoot region, thus having the overall appearance of an inverted S.

Also, the first reinforcing struts 122-125 as well as 121 extend essentially parallel across the bottom side of the sole 100. While the first reinforcing struts 121, 122-125 indeed slightly diverge in the heel region of the sole 100 and slightly converge in the toe region of the sole 100, as can be seen for example in FIG. 1a, throughout most parts of the bottom side of the sole 100 the relative distance between two of the first reinforcing struts 121, 122-125 does not change significantly, at least compared to the length of these first reinforcing struts.

Figure 1B:
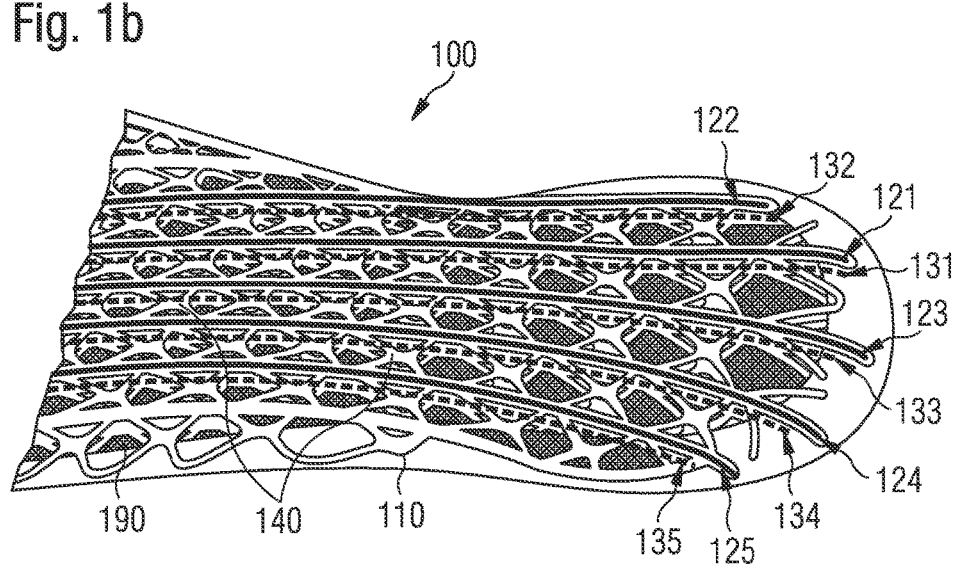
Figure 1C:
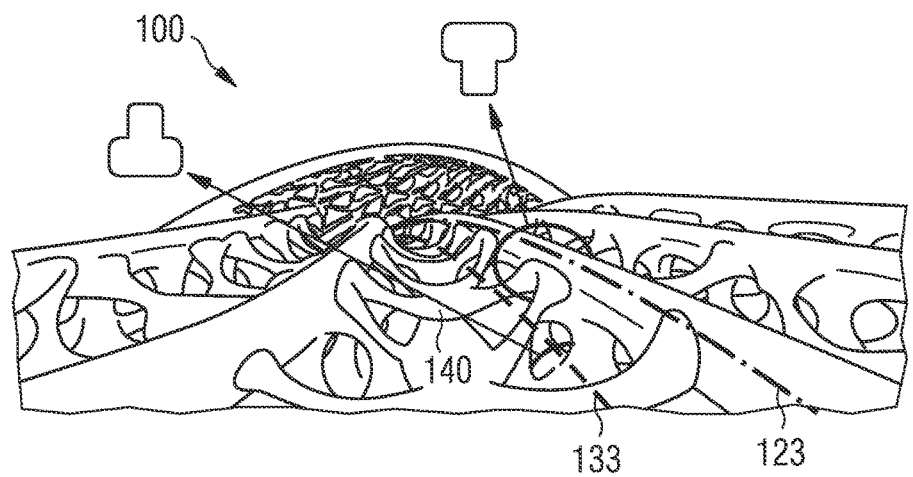

As can be seen for example in FIG. 1b, the sole 100 further comprises a plurality of second reinforcing struts 131-135 integrally manufactured with the rest of the sole 100 in the additive manufacturing process. The plurality of second reinforcing struts 131-135 provides a second reinforcing layer. In the perspective shown in FIG. 1b, the second reinforcing layer is arranged beneath the first reinforcing layer. Therefore, if the sole 100 is worn, the second reinforcing layer is positioned on top of the first reinforcing layer, the latter constituting the bottom side of the sole 100. On top of the sole 100 and the second reinforcing layer, a net 190 is arranged. The net 190 is more clearly visible in FIG. 1d. In FIGS. 1a, c and e-g, on the other hand, it has been omitted.

The second reinforcing struts 131-135 are arranged essentially parallel to the corresponding first reinforcing struts 121-125, meaning again that the distance between a pair of a first reinforcing strut, for example, first reinforcing strut 123, and its corresponding second reinforcing strut, for example, second reinforcing strut 133, does not change significantly, at least compared to the length of the struts. In general, all second reinforcing struts may correspond with a respective parallel first reinforcing strut or only a subset of the first and second reinforcing struts, respectively, may be arranged in essentially parallel pairs.

Furthermore, in the sole 100 shown here, two adjacent first reinforcing struts, for example, first reinforcing struts 123 and 124, together with their corresponding parallel second reinforcing struts, for example, second reinforcing struts 133 and 134, are interconnected by a plurality of nodes 140. As can be clearly seen for example in FIG. 1a, in a bottom view of the sole 100, the nodes 140 comprise an X-shaped cross-sectional form. However, for many of the nodes 140 not arranged at the side of the sole 100, which interconnect two pairs of corresponding first and second reinforcing struts, this is not only true in the bottom view of the sole 100, but also in a rear view of the sole 100 and in a side view of the sole 100. Hence, the general shape of such nodes 140 interconnecting four reinforcing struts can be visualized as being roughly comprised by the four diagonals of a cuboid which are interconnected in the center of the cuboid. Proximate edges, bumpers, cleat attachment points, and/or predetermined areas nodes may be formed between less than four struts.

The sole 100 further comprises coupling structures 151, 152 and 153 for attaching a cleat to the bottom side of the sole 100. The coupling structures 151, 152 and 153 are integrally formed with the first and/or second reinforcing struts. For example, the coupling structure 151 is integrally formed with the first reinforcing strut 121 and the corresponding parallel second reinforcing strut 131 and it divides both reinforcing struts 121, 131 into two respective subsections each. The coupling structure 152, on the other hand, is arranged between the two parallel first reinforcing struts 123 and 124 and their corresponding parallel second reinforcing struts 133 and 134, wherein the coupling structures 152 is merged into the struts 123, 124, 133 and 134 without intercepting them.

Figure 1D:
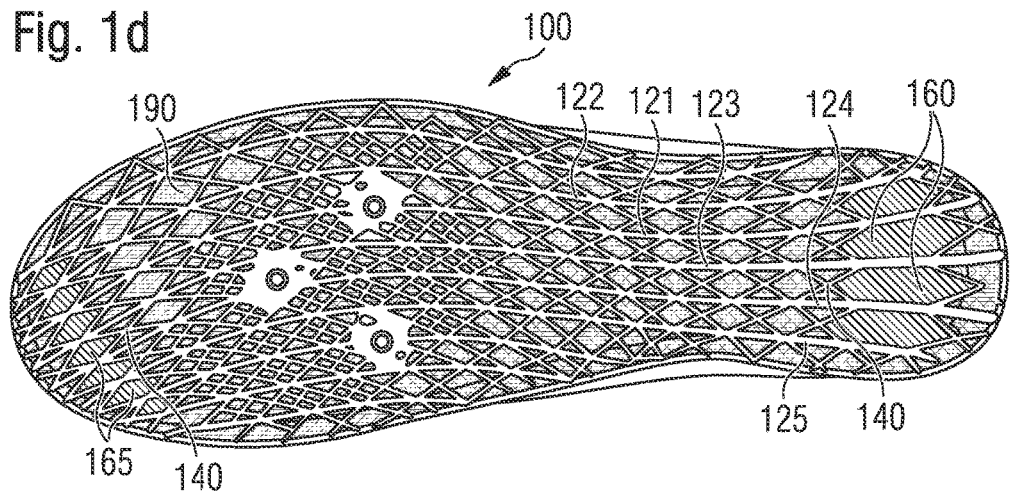

Moreover, as shown in FIG. 1d, the sole 100 may also comprise at least one first bumper elements 160, 165 in the heel region and/or in the toe region of the sole 100. In the case shown here, the first bumper elements 160 and 165 are arranged between two adjacent first reinforcing struts and their corresponding parallel second reinforcing struts. In particular, the first bumper elements 160, 165 may be clipped or pressed into the "cells" formed by adjacent first and second reinforcing struts and connecting nodes 140 without the need for additional bonding or attachment means, such that the first bumper elements 160 and 165 may be mounted or dismounted into the sole 100 by a wearer. In the mounted state, the first bumper elements 160 and 165 may protrude downwardly from the bottom side of the sole 100 and may thus increase the grip of the sole 100, for example when dismounting a bicycle and walking on a road.

Figure 1E:
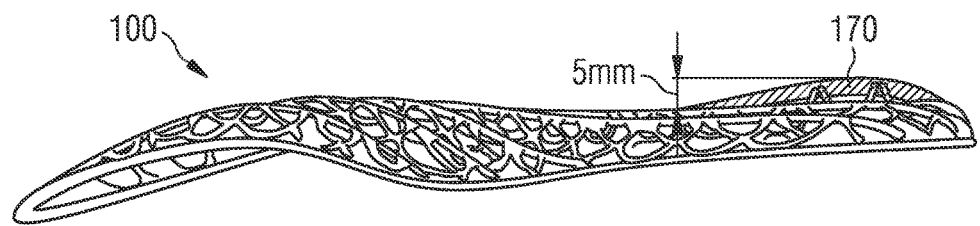
Figure 1F:
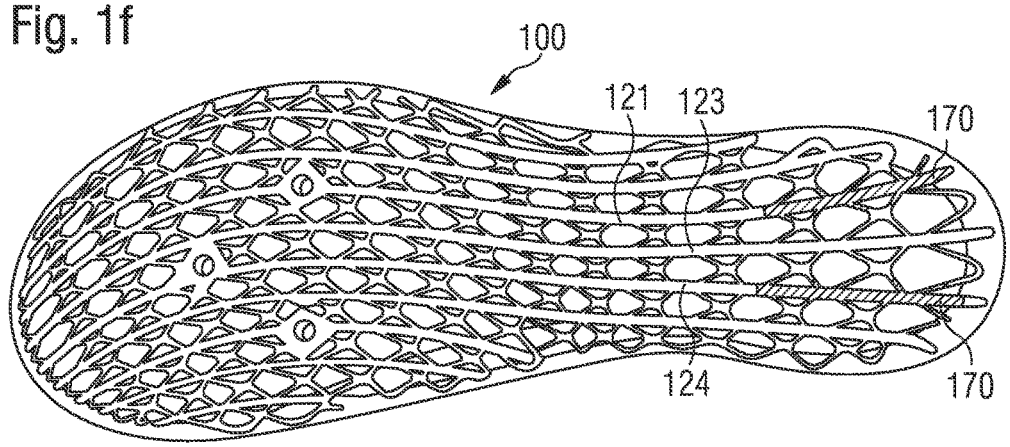
Figure 1G:
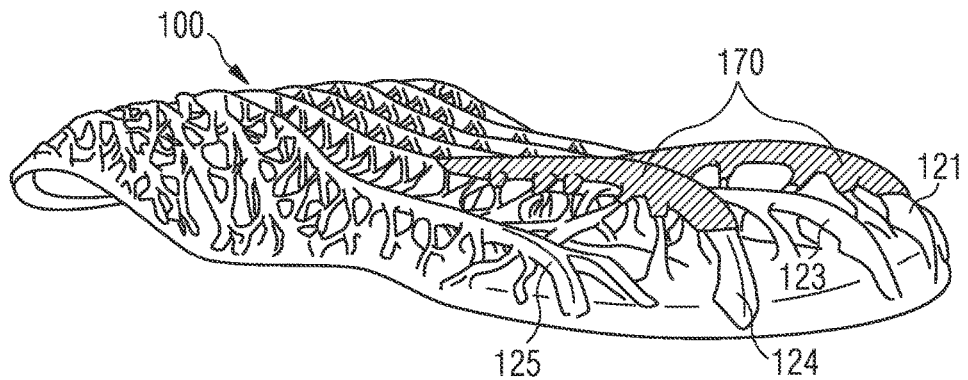

Furthermore, as shown in FIGS. 1e-g, it is also possible that the sole 100 comprises one or more second bumper elements 170, at least some of which are attached to the bottom side of one or more first reinforcing struts. In the case shown here, one second bumper element 170 is attached to the bottom side of the first reinforcing strut 121 and one second bumper element 170 is attached to the first reinforcing strut 124, such that the second bumper elements 170 are symmetrically arranged around the central first reinforcing strut 123. This may help prevent a wearer of the sole 100 from twisting his ankle which might easily happen if the second bumper elements 170 where arranged in an asymmetrical manner. As can be best be seen in FIG. 1e, the second bumper elements 170 protrude downward approximately 5 mm from the bottom side of the sole 100 in the heel region of the sole 100.

With regard to the just mentioned symmetrical arrangement of the second bumper elements 170, the skilled person will understand that this may also apply to the first bumper elements 160 and 165 discussed above.

It is, in particular, possible within the scope of the present invention, to alter the arrangement of the first and second reinforcing struts to allow a positioning of the first and second bumper elements as needed or desired to give the sole the required stability, for example when walking on a road.

Figure 2A:
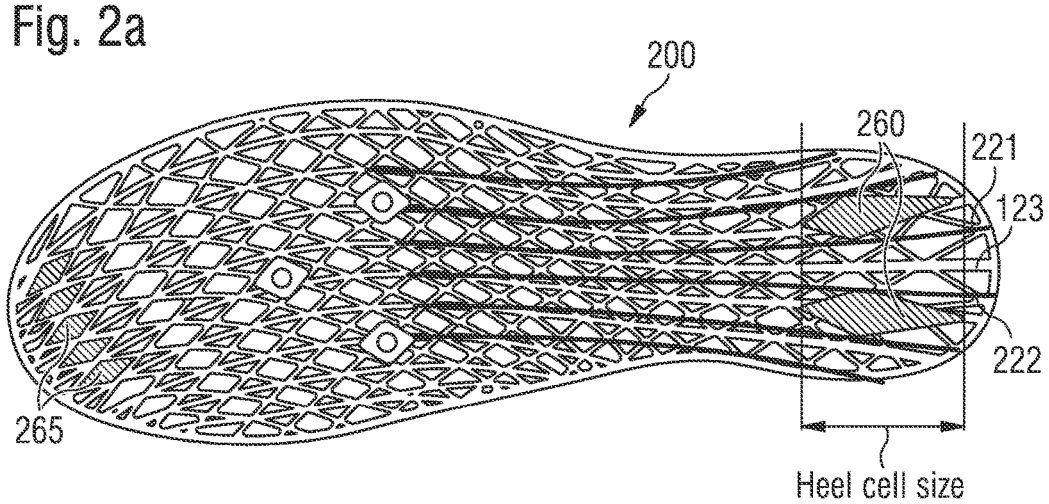
FIGS. 2a-c are bottom and perspective views of a shoe sole, according to certain embodiments of the present invention.
Figure 2B:
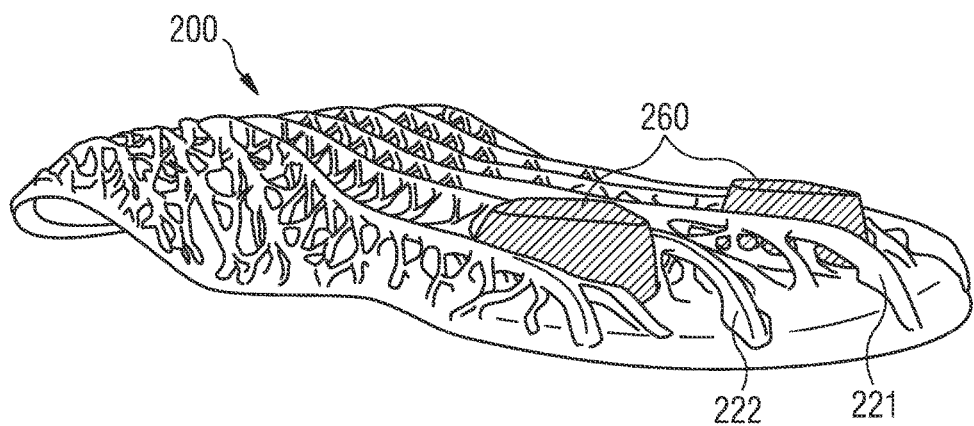
Figure 2C:
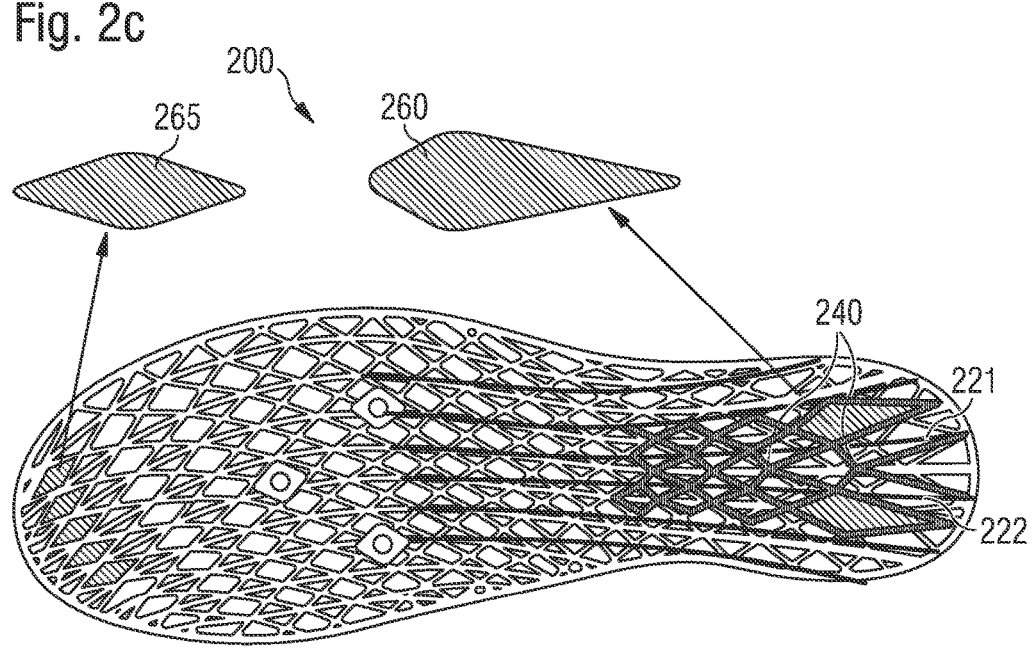

One example of such a possible modification of the arrangement of the first and second reinforcing struts is shown in FIGS. 2a-c. The sole 200 mainly differs from the sole 100 in the arrangement of the first and second reinforcing struts and potentially the nodes connecting the struts. For simplicity, only first reinforcing struts are shown in FIGS. 2a and c. As can be seen in, for example, FIG. 2a, the sole 200 does not comprise a central reinforcing strut (for comparison, the first reinforcing struts and, in particular, the central first reinforcing strut 123 of the sole 100 are also indicated in FIGS. 2a and 2c in a shaded manner). Rather, the two innermost first reinforcing struts 221 and 222 are both symmetrically displaced from a central axis of the sole 200 by a common distance. Further first reinforcing struts are then arranged parallel to these two innermost first reinforcing struts 221 and 222. Similar statements may apply for the corresponding second reinforcing struts, if present.

By comparison of FIGS. 2a and 2c with FIGS. 1d-g, it becomes apparent to the skilled person how a rearrangement of the first and second reinforcing struts influences the possible positioning of first bumper elements and second bumper elements (while only first bumper elements 260, 265 are shown in FIGS. 2a-c, the effect on the potential positioning of second bumper elements is clear). Finally, as indicated in the heel region of the sole 200 in FIG. 2c, by the design and arrangement of the nodes 240 connecting the first and potentially second reinforcing struts, the design of the cells into which the first bumper elements 260, 265 may be mounted, and therefore the design of the first bumper elements 260, 265 itself, may be further influenced.

Finally, FIG. 1c illustrates the possibility of providing the first and/or second reinforcing struts with different cross-sectional shapes. As shown for the exemplary case of the first reinforcing strut 123 and the corresponding parallel second reinforcing strut 133, it is, for example, possible to provide the first and second reinforcing struts, or some of them, with a T-shaped cross-section. As shown in FIG. 1c, it may be further beneficial in this case to have the bar of respective "T" facing the respective outside of the sole 100 (e.g., the bottom side for the first reinforcing strut 123 and the top side for the second reinforcing strut 133), such that sharp edges on the bottom or top side of the sole 100 can be avoided, which might lead to injuries and cuts on the foot of the wearer. The skilled person will conceive further possible cross-sections, for example cross-sections that may further increase the stability and bending stiffness of the reinforcing struts.

By means of the design options and features discussed, the sole 100 and also the modified sole 200 may be provided with a bending stiffness greater than that provided by conventionally constructed sole plates. For example, a bending stiffness of a sole plate constructed using additive manufacturing may be greater than 40 Newtons/millimeter (hereinafter "N/mm") at the heel portion of the sole plate and greater than 220 N/mm at the toe portion of the sole plate when measured as described herein. These values may vary based on materials and design.

For example, a sole plate constructed using laser sintering may have a bending stiffness in the heel region of the sole greater than 45 N/mm and in the toe region of greater than 300 N/mm when measured as described herein. Specifically, soles 100, 200 may be constructed using laser sintering from an aluminum alloy such that the bending stiffness in the heel region of the sole is greater than 50 N/mm and greater than 350 N/mm in the toe region when measured as described herein. Hence, the soles 100, 200 are particularly well suited for use in cycling shoes.

Figure 3A:
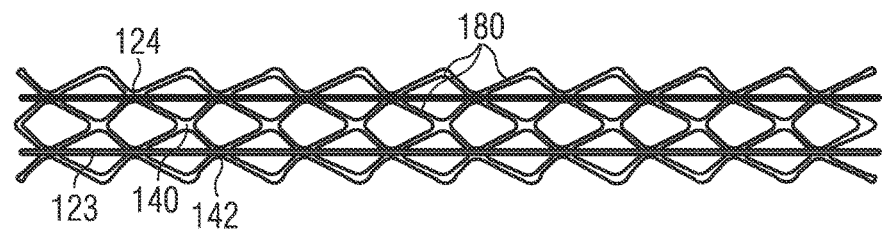
FIGS. 3a-g are views of portions of soles, according to certain embodiments of the present invention.
Figure 3B:
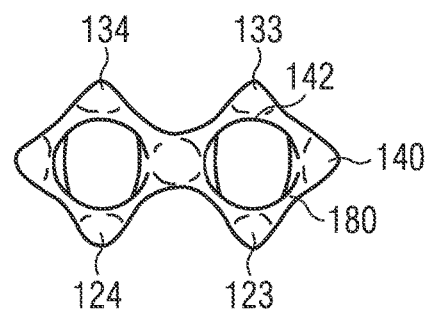
Figure 3C:
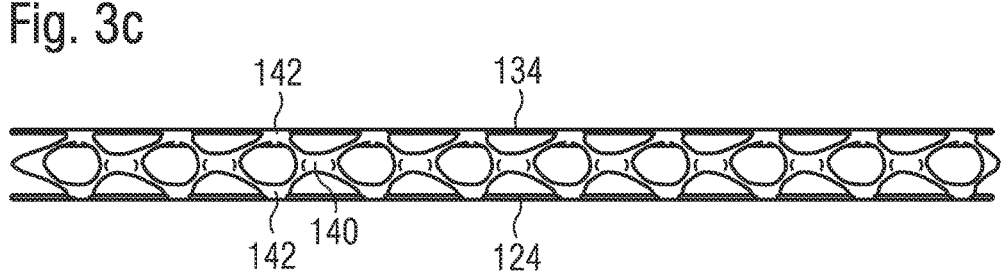

FIGS. 3a-g depict various views of portions of the soles 100, 200. FIG. 3a is a top view of an enlarged portion of two relatively parallel struts 123, 124 and lattice structure 180 associated with the struts. Lattice structure 180 includes nodes 140 positioned between the struts as can be clearly seen in the cross-section view of FIG. 3a depicted in FIG. 3b. As can be seen in the cross-section struts 123, 124, 133, 134 are positioned on lattice 180 between adjacent nodes 140 at nodes 142. As depicted in FIGS. 3b-3c, nodes 140 and nodes 142 are offset such that the struts 123, 124, 133, 134 are offset from nodes 140.

Figure 3D:
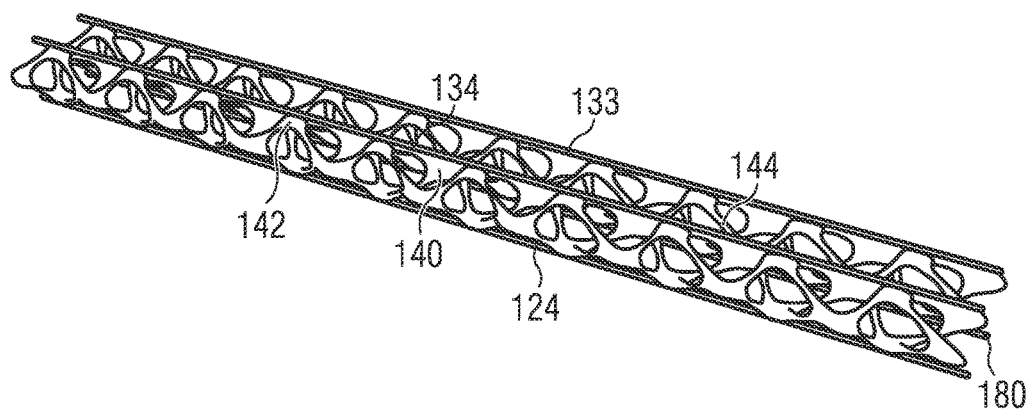
Figure 3E:
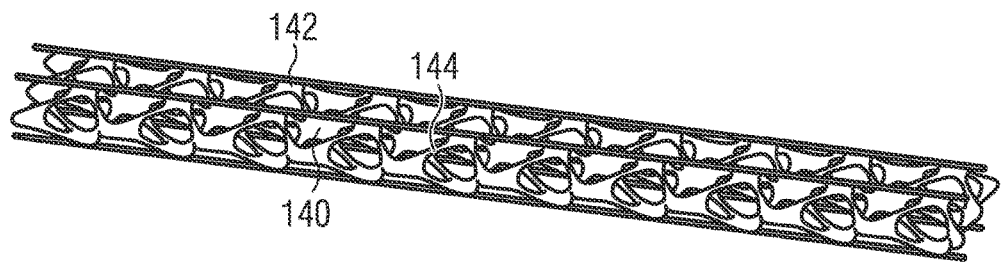
Figure 3F:
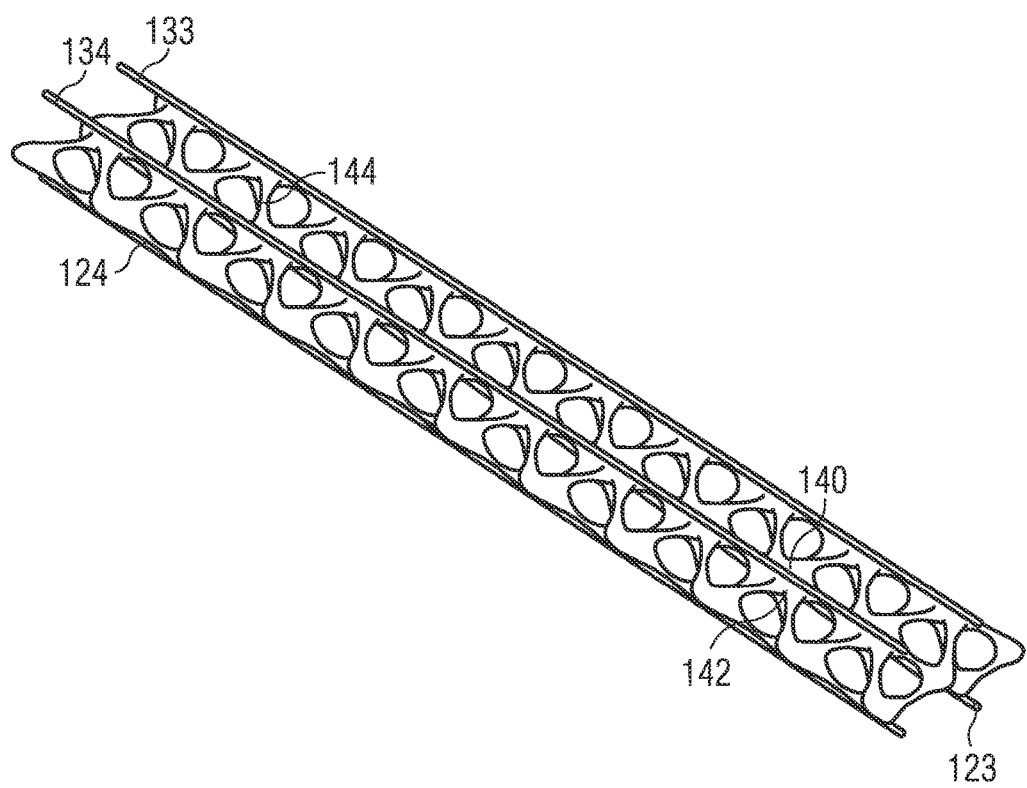

In the perspective views of a portion of a plate shown in FIGS. 3d-3g, nodes 140 are shown at a part of the lattice structure where eight supporting members 144 converge to form node 140. In contrast, as depicted, nodes 142 are formed at the convergence of four supporting members 144. For example, as shown in FIGS. 3*d-f* proximate edges of the lattice nodes 142 are formed between two struts. In alternate embodiments, nodes may be used to connect one or more reinforcing struts. For example, to increase density of supporting members and/or stiffness of a part, such as a sole, nodes may be used to connect four or more reinforcing struts.

Figure 3G:
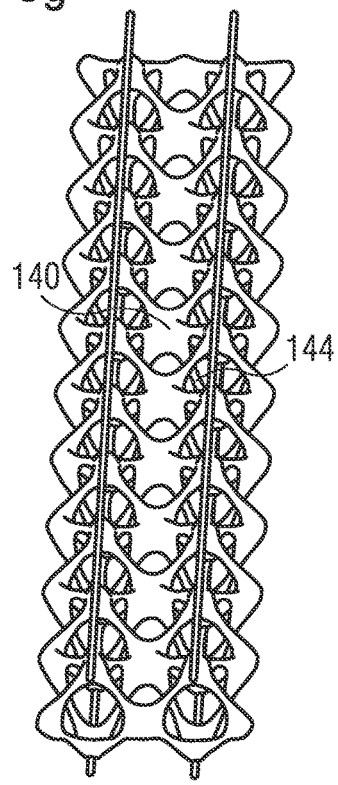

As clearly shown in FIG. 3*g*, reinforcing struts may be interconnected by a plurality of nodes. More specifically, adjacent first reinforcing struts 123, 124 and their corresponding essentially parallel second reinforcing struts 133, 134 are interconnected by a plurality of nodes 140, 142.

Construction of the sole with first and second reinforcing struts interconnected by such nodes allows for a lightweight and breathable sole which may be considerably lighter than a conventional sole plate having similar properties, for example, similar stiffness values.

Figure 4A:
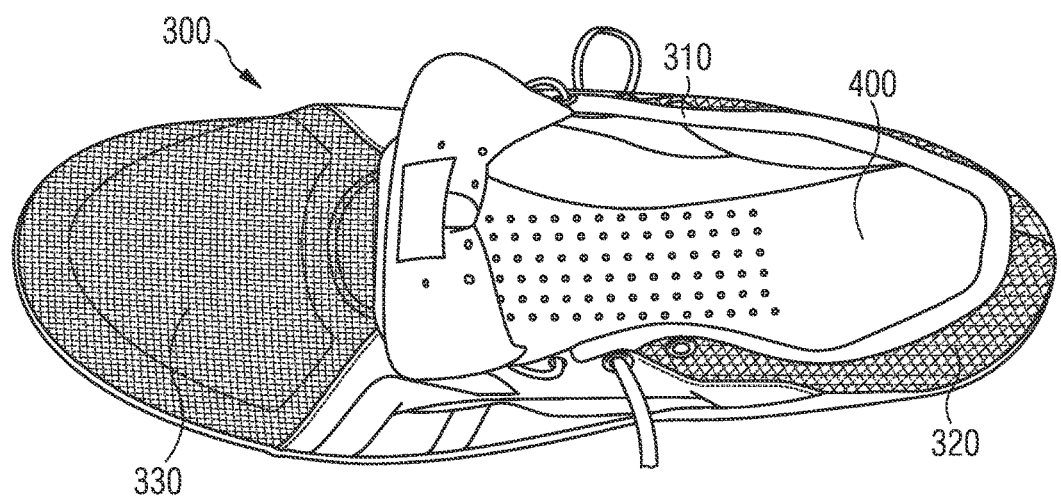
FIGS. 4a-g are views a shoe, according to certain embodiments of the present invention.
Figure 4B:
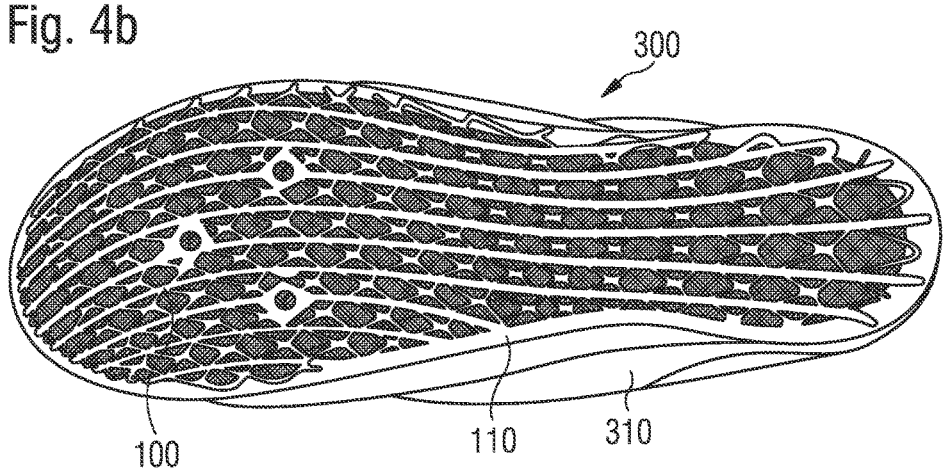
Figure 4C:
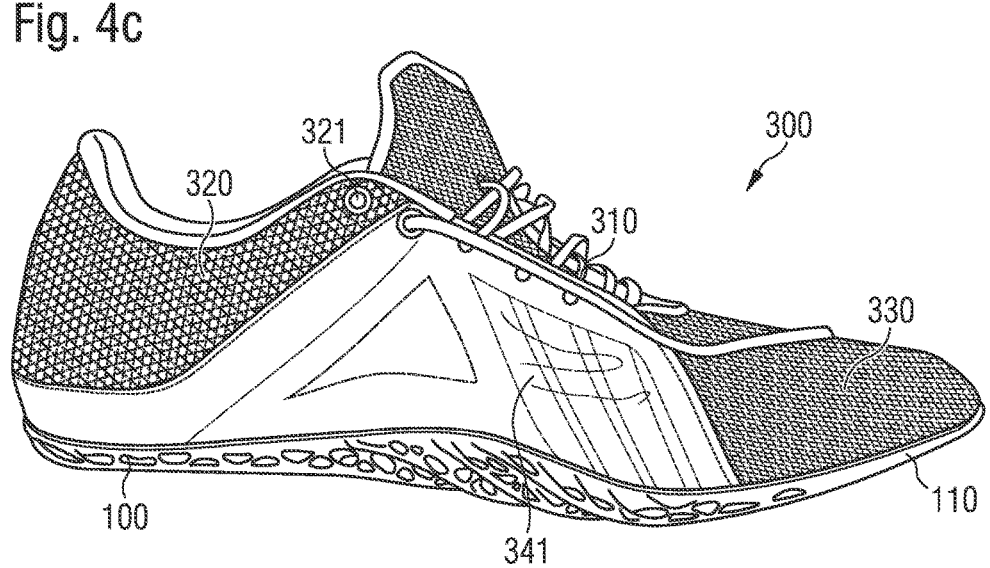
Figure 4D:
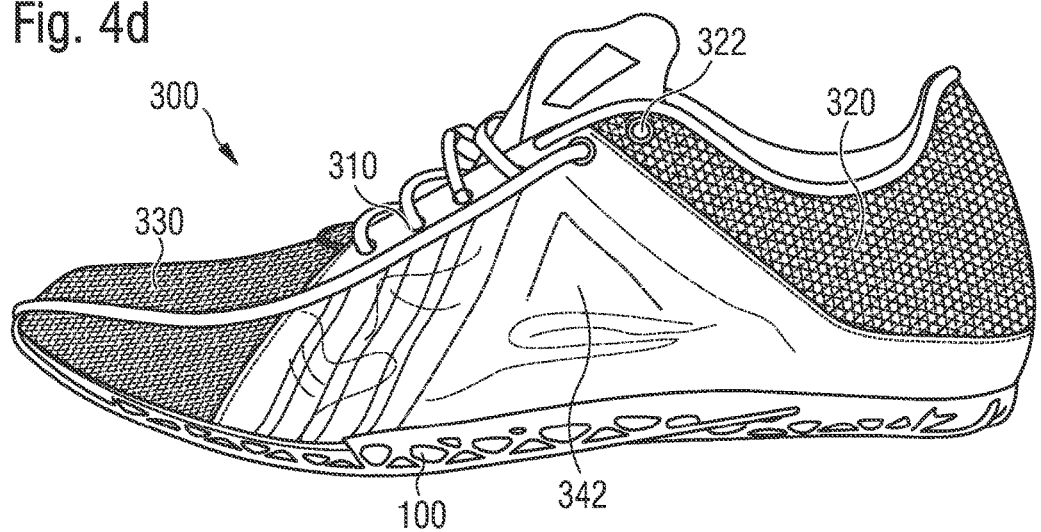
Figure 4E:
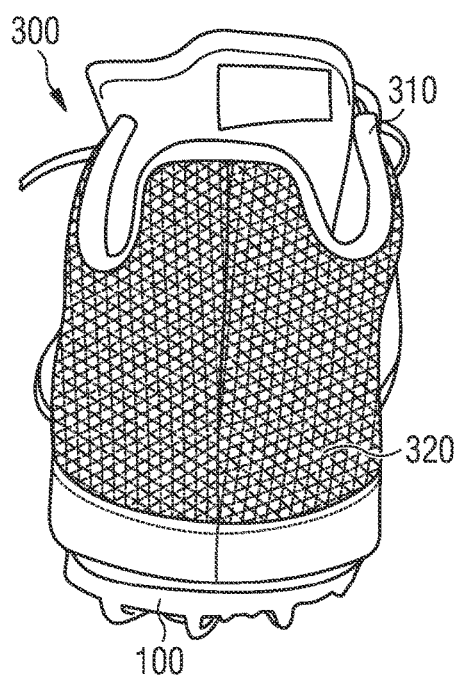
Figure 4F:
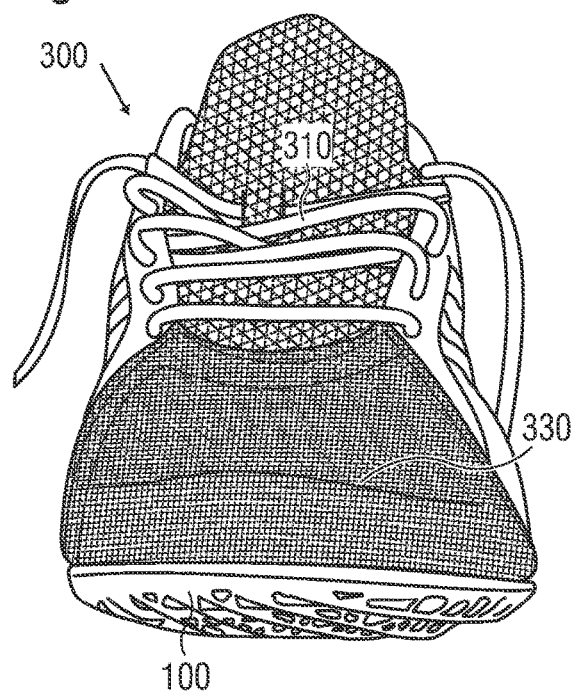
Figure 4G:
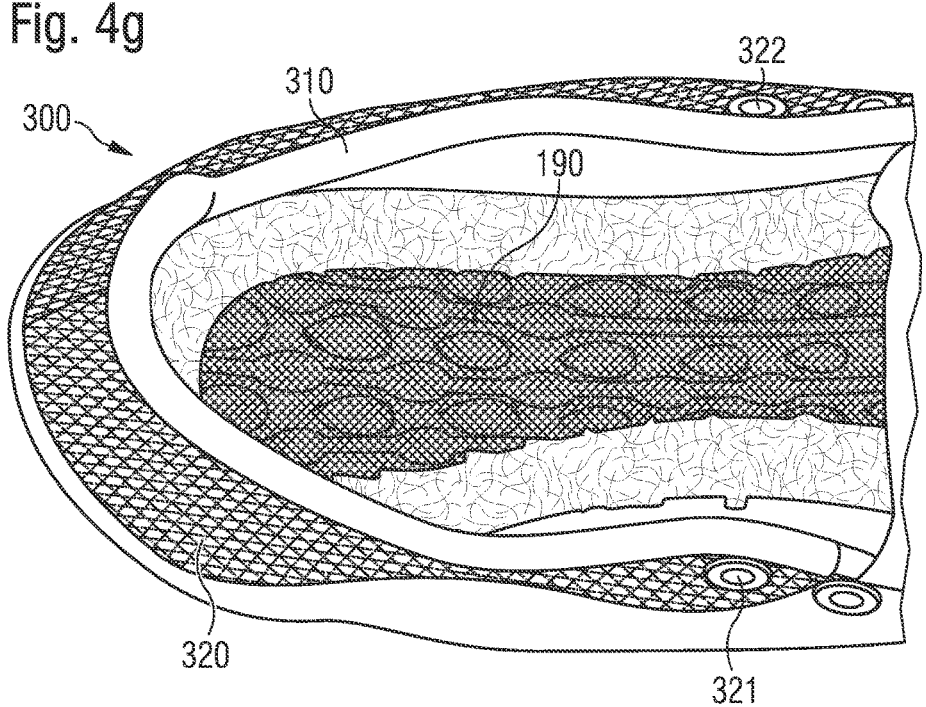

FIGS. 4*a-g* show an embodiment of a cycling shoe 300. FIG. 4*a* shows a top view of the shoe 300 and FIG. 4*b* a bottom view. FIG. 4*c* shows a medial side view of the shoe 300 and FIG. 4*d* a lateral side view. FIG. 4*e* shows a rear view of the shoe 300 and FIG. 4*f* a front view. Finally, FIG. 4*g* shows an enlarged view of the heel region of the shoe 300 in a top view.

The shoe 300 comprises an inventive sole 100, as discussed above. Alternatively, the shoe 300 could also comprise a sole 200 as discussed above or another embodiment of a sole according to the invention. The shoe 300 further comprises an upper 310 that is attached to the three-dimensionally shaped rim 110 of the sole 100. The upper 310 may, for example, be glued to the rim 110 or otherwise connected therewith.

The upper 310 comprises a heel portion 320 which extends around and underneath the ankle bone up to the instep of the foot and, in particular, up to the medial and lateral top holes 321 and 322 of the lacing system, to allow securing the foot within the shoe 300. Alternate closure devices for shoes may be used as well including, but not limited to hook and loop fasteners (e.g., Velcro®), hook and pile fasteners, touch fasteners, zippers, snap fasteners, ratchet, lacing systems (e.g., reel and cable systems, shoelaces, etc.) and/or combinations thereof.

The heel portion 320 comprises a textile material. As shown in FIGS. 4*a-g*, an example of the textile material in the present case is a triaxial textile fabric which is laminated on both sides with a plastic material. The triaxial textile fabric is comprised of three sets of parallel textile strands as depicted. The strands of the respective sets are arranged in such a manner that they intersect strands of the other two sets at an angle of about 60°. Materials used in the heel portion may include, but are not limited to, textiles, non-wovens, laminates, non-textiles such as molded parts for example EVA parts, PU parts, any materials used in conventional uppers, straps, and/or combinations thereof. It should be understood that the triaxial textile fabric is an example and that other materials, such as foils, non-wovens, textiles or fabrics may be used as well.

As depicted, the upper 310 furthermore comprises a net-like textile material 330 in the toe region to improve breathability of the shoe 300. Alternatively, any breathable material may be used in the toe region of the upper. In the medial and lateral central region, the upper 310 furthermore comprises medial and lateral side wings 341 and 342 comprising a foil-like material. Materials used in wings 341, 342 may include materials having high tensile strength while being lightweight. For example, materials used in the wings may include, but are not limited to textiles, non-wovens such as flexible non-woven laminates, ultrahigh molecular weight polyethylenes (e.g., Dyneema®) and/other materials known in the art. The side wings 341 and 342 may be provided with further stabilization elements that may be glued, welded or otherwise bonded to the in- or the outside of the foil-like material.

Moreover, the shoe with 300 comprises a net 190, which is arranged on the top side of the sole 100, as already discussed before. The net 190 could also be provided as a membrane to prevent water from entering the shoe 300 through the sole 100.

Finally, the shoe 300 may further comprise a sockliner 400 as shown in FIG. 4*a*. The sockliner 400 was removed in FIG. 4*g* to provide a view of the net 190.

Figure 5A:
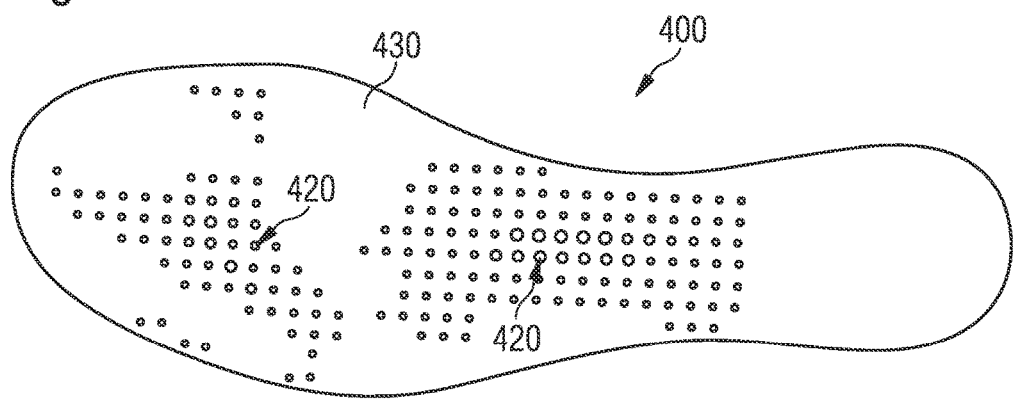
FIGS. 5a-b are views of a sockliner that may be used with a shoe, according to certain embodiments of the present invention.
Figure 5B:
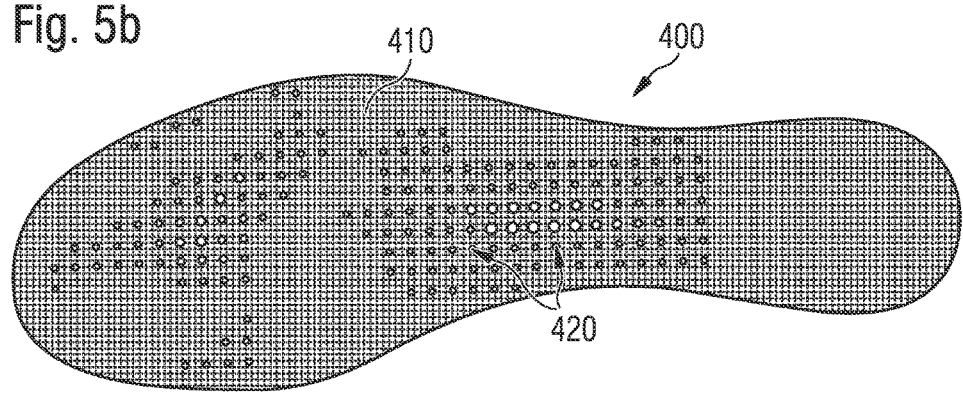

The sockliner 400 is shown in more detail in FIGS. 5*a-b*. The sockliner 400 may include, but is not limited to composites, textiles, carbon fibers, polypropylene ("PP"), polyurethanes ("PU", like e.g., thermoplastic polyurethane ("TPU")), thermoplastic elastomers ("TPE"), thermally conductive materials, foamed materials, for example, ethylene vinyl acetate ("EVA") expanded polypropylene ("EPP"), and/or expanded thermoplastic polyurethane ("eTPU"), and/or combinations thereof.

As depicted, the sockliner 400 may comprise a material layer 410, which may be arranged on the bottom side of the sockliner 400. For example, the material layer may comprise woven carbon fibers to increase the stability and tear strength of the sockliner 400. Other fibers may be used as well. On the top side, the sockliner 400 may, for example, comprise a felt material 430 or the like to improve the wearing comfort. Finally, the sockliner 400 may comprise a number of holes 420 of different diameters and in different regions and arrangements, which may help to adapt the sockliner 400 to the anatomy of a wearer's foot and to improve ventilation of the shoe 300.

The sockliner 400 may also comprise thermally conductive material to bring heat away from the foot. The sockliner may also distribute lattice pressure so as to avoid blisters etc. on the wearer's foot. In one example, the sockliner 400 may comprise at least one portion made of carbon. As another example, the sockliner 400 may at least partly be made of standard EVA. It is also conceivable for any embodiments discussed herein that the sockliner 400 comprises a combination of EVA foam (e.g., on the side part of the sockliner 400) and carbon (e.g., carbon tape), which could be provided, in one example, on the bottom side of the sockliner 400. As another example, the sockliner 400 may comprise carbon fiber plates. Of course, it is also conceivable to arrange the carbon on the top side of the sockliner and/or the EVA foam on the bottom side of the sockliner 400.

Using carbon and/or carbon fiber plates is particularly advantageous because it allows to reduce the pressure points on the foot. For improving the thermal properties, and in particular the heat dissipation, the sockliner 400 (for instance, comprising or made of carbon) may further comprise at least one heatsink. Heat sink materials are materials which have increased thermal conductivity properties and may include, but are not limited to, polymers, such as filled-polymer laminates and/or polymers which comprise metal oxides, for example, polymers with a high metal oxide content.

Extensive tests have shown that in particular the combination of a sockliner 400 made of carbon and at least one heat sink greatly improves the heat dissipation properties. This is even more the case if the heat sink material is at least partially in contact with the material of the sole (e.g., made of metal) and the airflow. In one example, the heat sink can be placed only at the calcaneus and/or metatarsal position. In another example, it is conceivable that the sockliner 400 is only provided in the calcaneus and/or metatarsal position so as to further improve the climate in non-loaded areas.

As a non-limiting example, the heat sink can be made of a thermally conductive, filled-polymer laminate. Optionally, this laminate can be provided on a mesh. However, such mesh is not necessary, and not using a mesh may even further improve the heat dissipation properties. In one example, Gap Pad A3000 available from The Bergquist Company can be used as heat sink material. In combination and/or separately to the above, the sockliner 400 may also be perforated at least partly (e.g., in the midfoot region) in order to further improve the heat dissipation properties and to reduce the weight of the sockliner 400.

As a result, the present disclosure provides for a shoe, in particular for a cycling shoe, comprising a sole, comprising a three-dimensionally shaped rim and a plurality of first reinforcing struts. In one example, at least two of the plurality of first reinforcing struts extend from a heel region of the rim of the sole to a toe region of the rim of the sole, and the rim of the sole and the plurality of first reinforcing struts are integrally manufactured as a single piece in an additive manufacturing process. The shoe further comprises a sockliner 400 at least partly made of carbon and comprising at least one heatsink. The at least one heatsink may be in contact with the sole. The above discussed sockliner 400 may be used in combination with any of the embodiments described herein.

Figure 6:
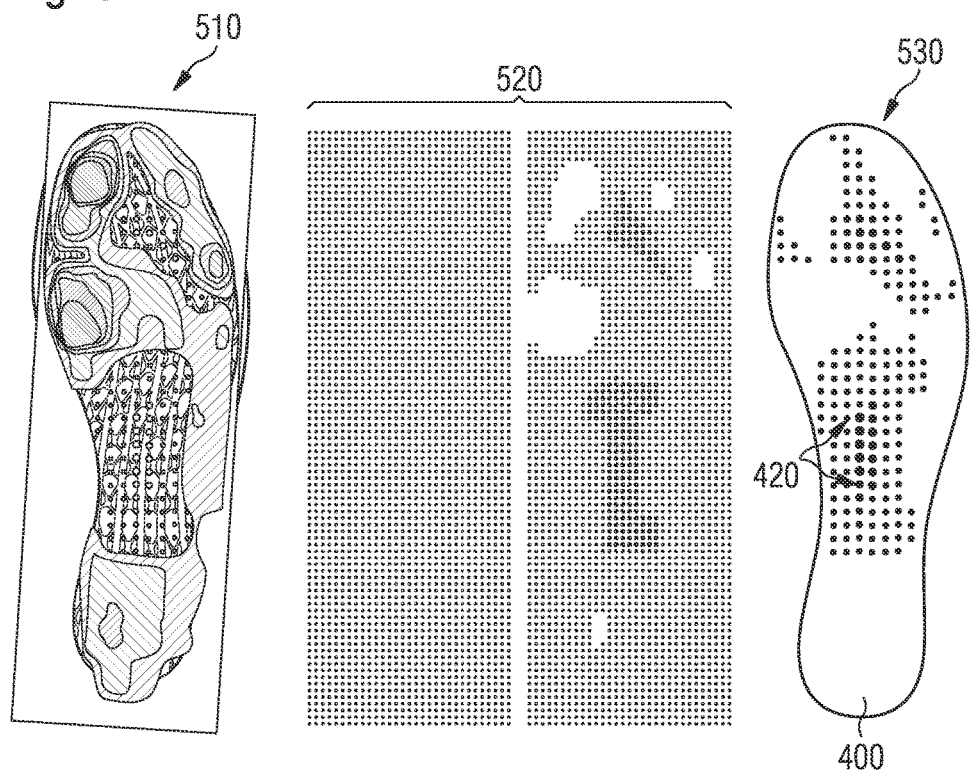
FIG. 6 is an illustration of a method for the manufacture of the sockliner of FIGS. 5a-b.

FIG. 6 illustrates how the arrangement and design of the holes 420 may be determined to adapt the sockliner 400 to the anatomy of a wearer's foot. In a first step 510, the pressure distribution of the foot may be measured by a pressure plate, in certain embodiments. Such a pressure plate is well known in the industry. In a next step 520, the pressure distribution is mapped to a 2D rectangular grid, the areas of highest measured pressure are removed from the grid and in areas of lower pressure, in diameters of the grid points are increased proportional to the measured pressure. From the resulting customized grid, the distribution and diameters of the holes 420 in the sockliner 400 are then determined in a further step 530 and the sockliner 400 is manufactured accordingly.

Further, pressure distribution maps, an example of which is shown in step 510 of FIG. 6, may also be used to adjust the design of the sole. For example, a lattice may be wholly designed or locally reinforced using the pressure map to allow for tailored stiffness to suit the individual needs of a user. This may allow for specific customization of the lattice stiffness based on loading of the footwear. For example, a number of nodes and/or a number of supporting members forming nodes may be increased or decreased depending on predetermined requirements for a design. In some cases, the thickness of the supporting members may be increased and/or decreased in specific areas depending on the loading requirements for the sole.

Figure 7:
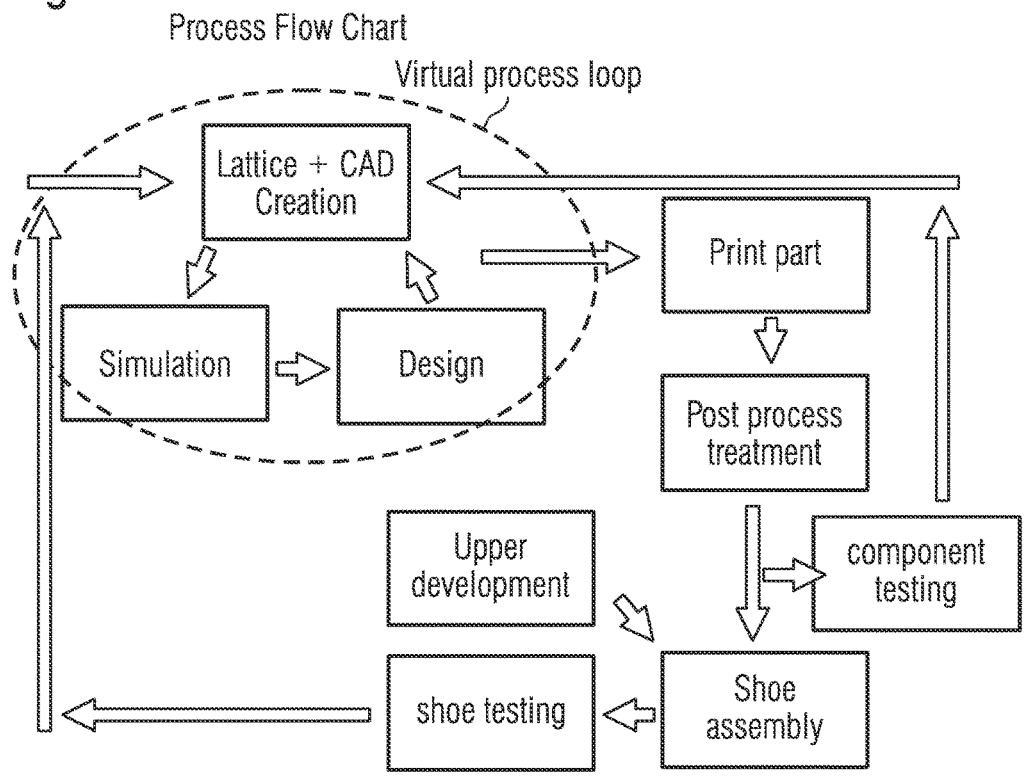
FIG. 7 is an illustration of a manufacturing process of a shoe sole and shoe, according to certain embodiments of the present invention.
Figure 8A:
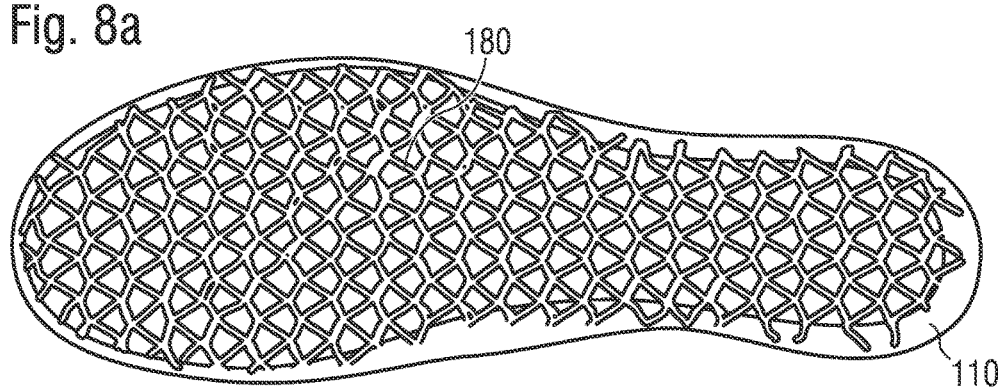
FIGS. 8a-e are views of a shoe sole, according to certain embodiments of the present invention.
Figure 8B:
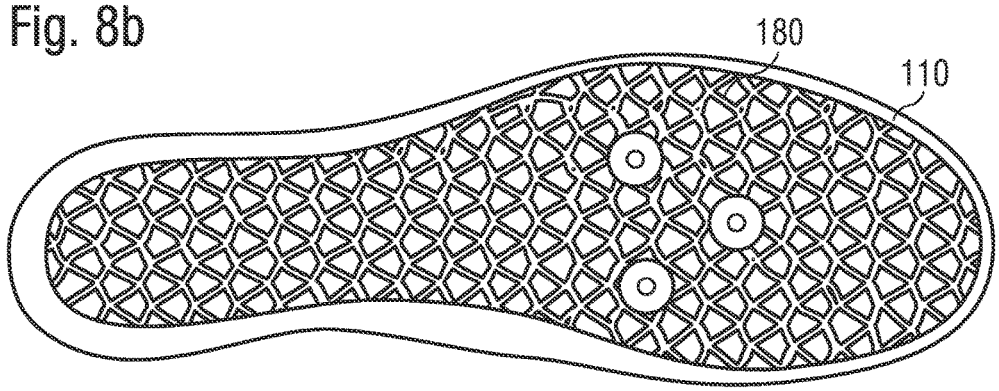
Figure 8C:
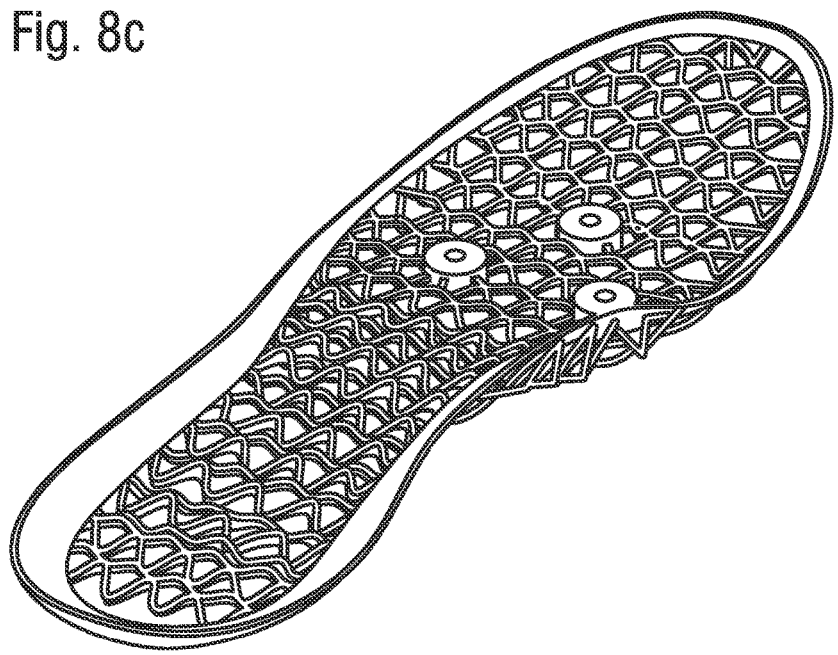
Figure 8D:
Figure 8E:
Figure 9A:
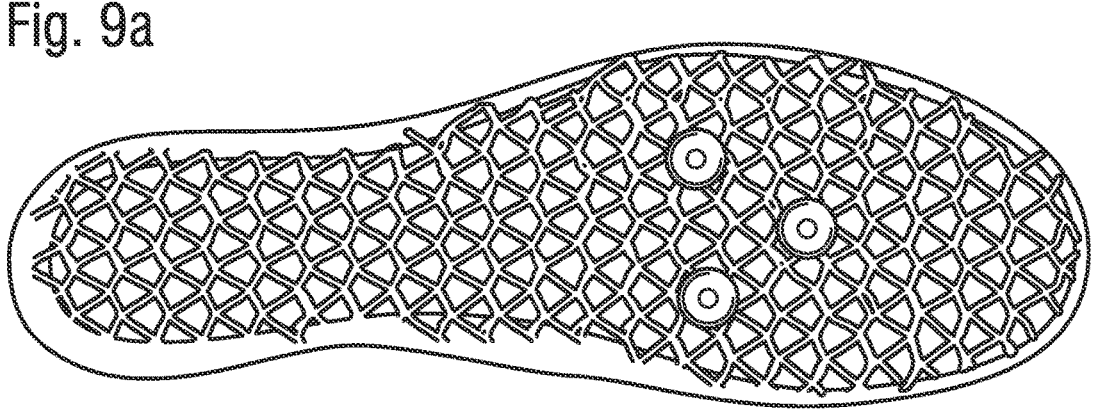
FIGS. 9a-e are views of a shoe sole, according to certain embodiments of the present invention.
Figure 9B:
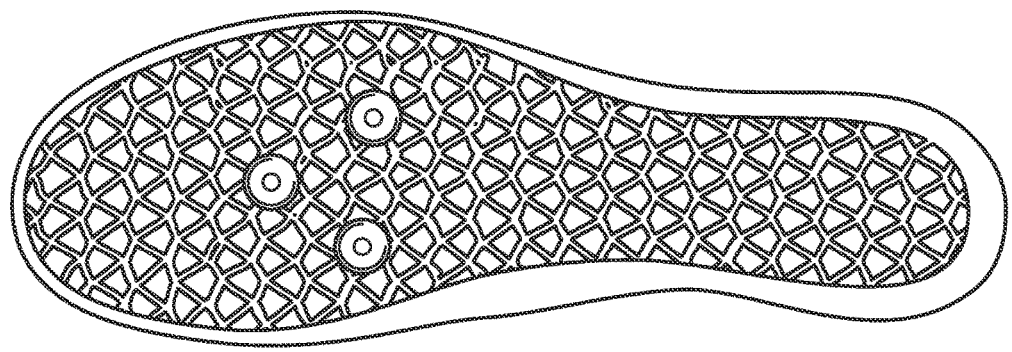
Figure 9C:
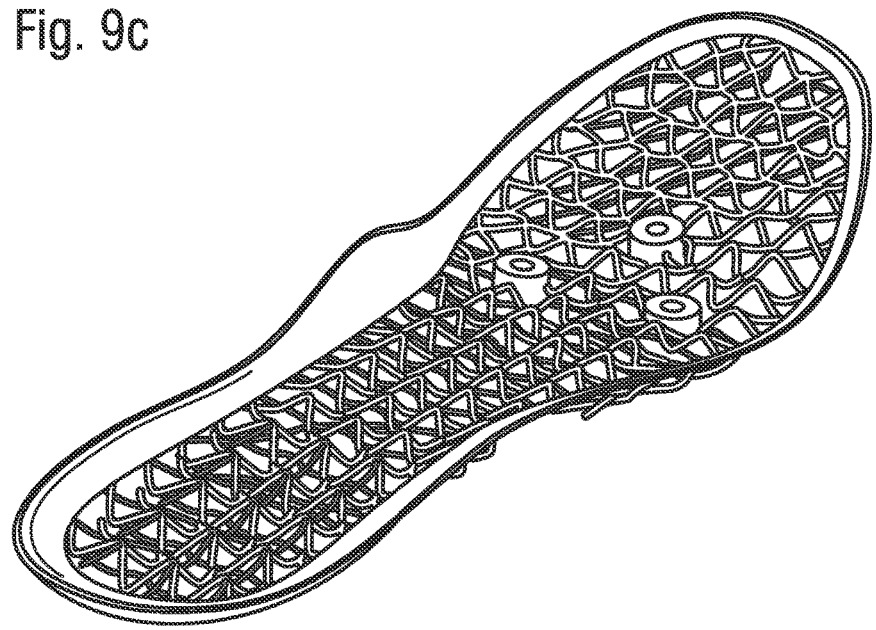
Figure 9D:
Figure 9E:

As depicted in the flow chart in FIG. 7, producing parts using additive manufacturing may include multiple steps and/or feedback loops. Designs for parts may be created and/or optimized using commercially available or developed software. Simulations may be run to determine the strain values, stress values, and/or stiffness at various points in the design. For example, simulations may be used to determine areas of high strain in the design for a given design and use. Based on the determined strain values, the design may be altered. In particular, in areas of high strain the geometries of the design and/or the materials used may be adjusted such that the design has an increased working strain at the identified high strain areas.

As illustrated in FIG. 7, after design is complete sample parts may be constructed using additive manufacturing. Additive manufacturing methods may include, but are not limited to laser sintering such as direct metal laser sintering, laser melting, electron-beam melting, selective laser melting, selective heat sintering, selective laser sintering, etc., fused deposition modeling, electron beam freeform fabrication, 3D printing, laminated object manufacturing, stereolithography, fine layer technique, drop-on-powder, digital light processing, other process known in the art, and/or combinations thereof.

Materials used may include, but are not limited to metals such as magnesium, aluminum, titanium, steel (e.g., maraging steel, stainless steel) or the like, alloys such as aluminum alloys (e.g., AlSiMg), titanium alloys (e.g., Ti64, Ti6AlV4), cobalt chrome alloys (e.g., CC MP1), nickel alloys (e.g., IN718, NiCr19Fe19NbMo3), super-alloys, composites, thermoplastics, thermosets, and/or combinations thereof.

In some instances, constructed parts may undergo additional post-process treatments. Post-process treatments which may be used include, but are not limited to abrasive blasting, shot peening, polishing, electrochemical polishing, optical polishing, machining, computer numerical control (i.e., CNC) finishing, abrasive flow machining, electroplating, micro machining processing, hot isostatic pressing, heat treatment, other processes known in the art, and/or combinations thereof.

Completed parts are tested for various properties as shown in FIG. 7, when necessary the various properties of the parts may be adjusted and the process can start again. After completion of the parts, they may be incorporated into shoes for additional testing. After which adjustments to the designs can be made when necessary.

The weight of parts produced by additive manufacturing, and more specifically laser sintering, can vary depending on the size of the part. Generally, for shoe soles described herein test results are cited for a standard UK size 8.5. Testing results, for example, weights, stiffness values, etc. will vary based on the size of the sole plate or parts and the intended use of the sole plate, more specifically the intended kind of sports.

In general, it may be desirable for laser sintered cycling sole plates to have a weight less than about 150 g for a standard UK size 8.5. An example may include laser sintered plates having a weight of less than 130 g. Cycling plates having a weight of less than 100 g may be desired. Some sole plates may have a weight of less than 70 g.

An advantage of this process and the design it is capable of producing is the reduced weight of the parts with respect to their stiffness. Parts formed in this manner may have a higher bending stiffness to weight ratio than similar parts formed of conventional materials like, for example, carbon fiber based parts. Additive manufacturing methods allow for more complex designs which are cost-prohibitive, if not impossible to construct using conventional methods.

The value for the stiffness to weight ratio may be influenced by material choice and/or design of the part. For example, strut thickness may be varied to increase the stiffness in localized areas such that bespoke component properties are achieved. Further, geometry of the part may vary, for example, reinforcing struts may be positioned in any direction (e.g., medial-lateral, diagonal, etc.) and do not necessarily run only heel to toe.

Further, in some alternate examples, as shown in FIGS. 8-9, a sole for a shoe may be formed in a manner such that reinforcing struts are reduced and/or eliminated. FIGS. 8-9 depict lattice 180 integrally formed with rim 110. As discussed herein, lattice 180 may be designed such that support members 144 located in high strain areas may be, for example, thickened to increase the strength of the lattice in those areas. In some areas, different materials may be used to strengthen areas of the lattice and/or rim that have been identified as experiencing high strain values.

Figure 10:
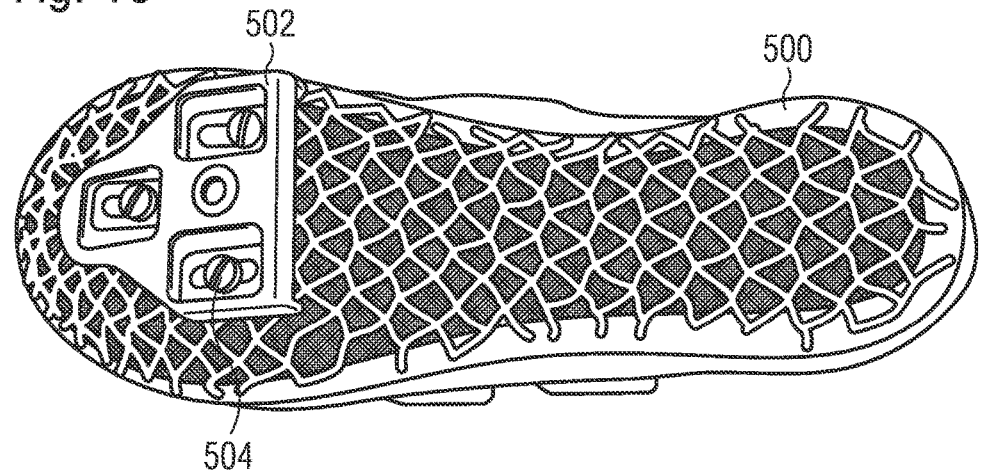
FIG. 10 is a view of a shoe sole and shoe, according to certain embodiments of the present invention.

FIG. 10 depicts sole 500 coupled to cleat 502. As depicted, cleat 502 may be coupled to sole 500 using fasteners 504, such as screws or any other fasteners known in the art. Cleat 502 may be constructed in part from thermally insulating materials to inhibit and/or prevent heat transfer between the ground and the sole in extreme weather conditions.

Alternately, a sole manufactured using additive manufacturing techniques may include a device for coupling the sole to a pedal directly. For example, the cleat may be designed into the structure of the sole. In addition, it may be desirable to design a sole such that the sole can be directly coupled to a pedal. Further, it may be desirable to design a sole and pedal in combination such that the sole can be directly coupled to a pedal to ensure the best possible transfer of energy from the cyclist to the bike.

Figure 11:
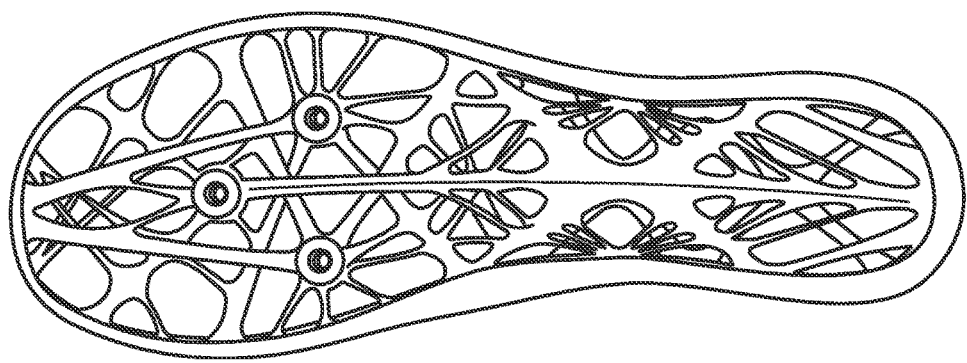
FIG. 11 is a view of a shoe sole, according to certain embodiments of the present invention.

FIG. 11 depicts an alternate design of a sole having a combination of struts and nodes. This design may be utilized to provide stiffness while reducing weight.

Figure 12:
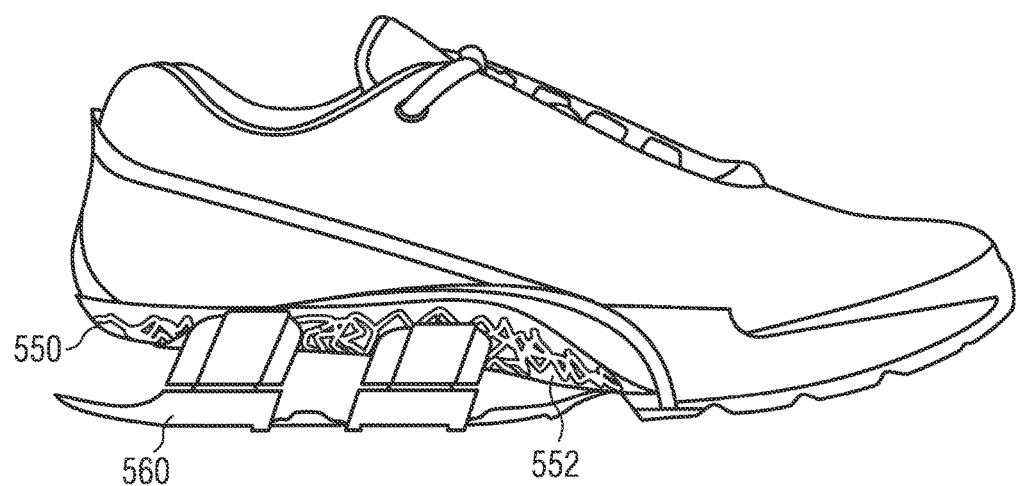
FIG. 12 is a view of a shoe, according to certain embodiments of the present invention.

As shown in FIG. 12, partial sole plate 550 may also be constructed using the designs and/or methods described herein. For example, chassis 552 for a suspension system 560 in a shoe may include a metal sintered partial sole plate 550 as shown in FIG. 12.

Components of shoes which may be formed using additive manufacturing of materials may include components which require a specific stiffness to weight ratio for a given application. Further, depending on the part constructed it may be desirable to vary the stiffness of a part in various locations of the part. For example, a portion of the sole may have an increased stiffness near the cleat attachment when compared to other areas of the sole.

Measurement of strain values may be made by attaching strain gauges to the shoe and/or sole and/or using a 3D optical strain measurement device. Based on fatigue limits of the material of choice, desired lifespan of the sole and strain measurements, acceptable strain values may be determined to aid in the design of the geometry of the sole. Similar determinations can be made for any part constructed using additive manufacturing, in particular laser sintering.

Bending stiffness of parts may be measured using various mechanical tests including, but not limited to a 3-point bend test, a cantilever bend test and/or other tests known in the art. In particular, testing of the stiffness of parts may involve determining the load necessary to obtain a specific deformation and/or displacement from the neutral position of the part.

Figure 13:
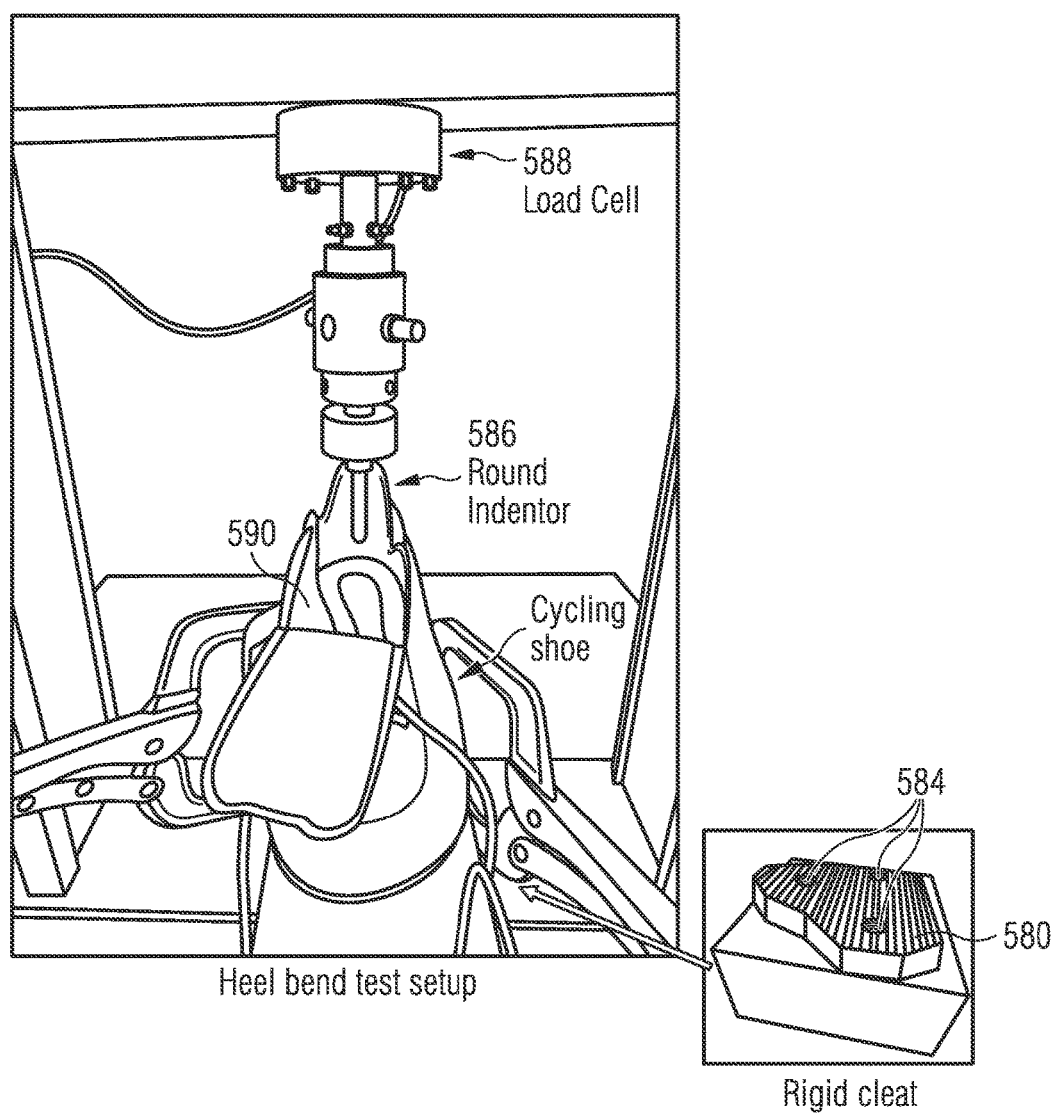
FIG. 13 is an illustration of an apparatus for measuring the bending stiffness of a shoe sole plate.

For example, as shown in FIG. 13, bending stiffnesses of a cycling shoe plate of conventional materials were determined using mechanical tests which utilized an electromechanical testing device (i.e., Instron 3366) at a temperature of 23° C. and a humidity of 50%. Testing of various materials and constructions was compiled and used to calibrate the simulation used to approximate values for new designs of the plate according to the invention.

Figure 14:
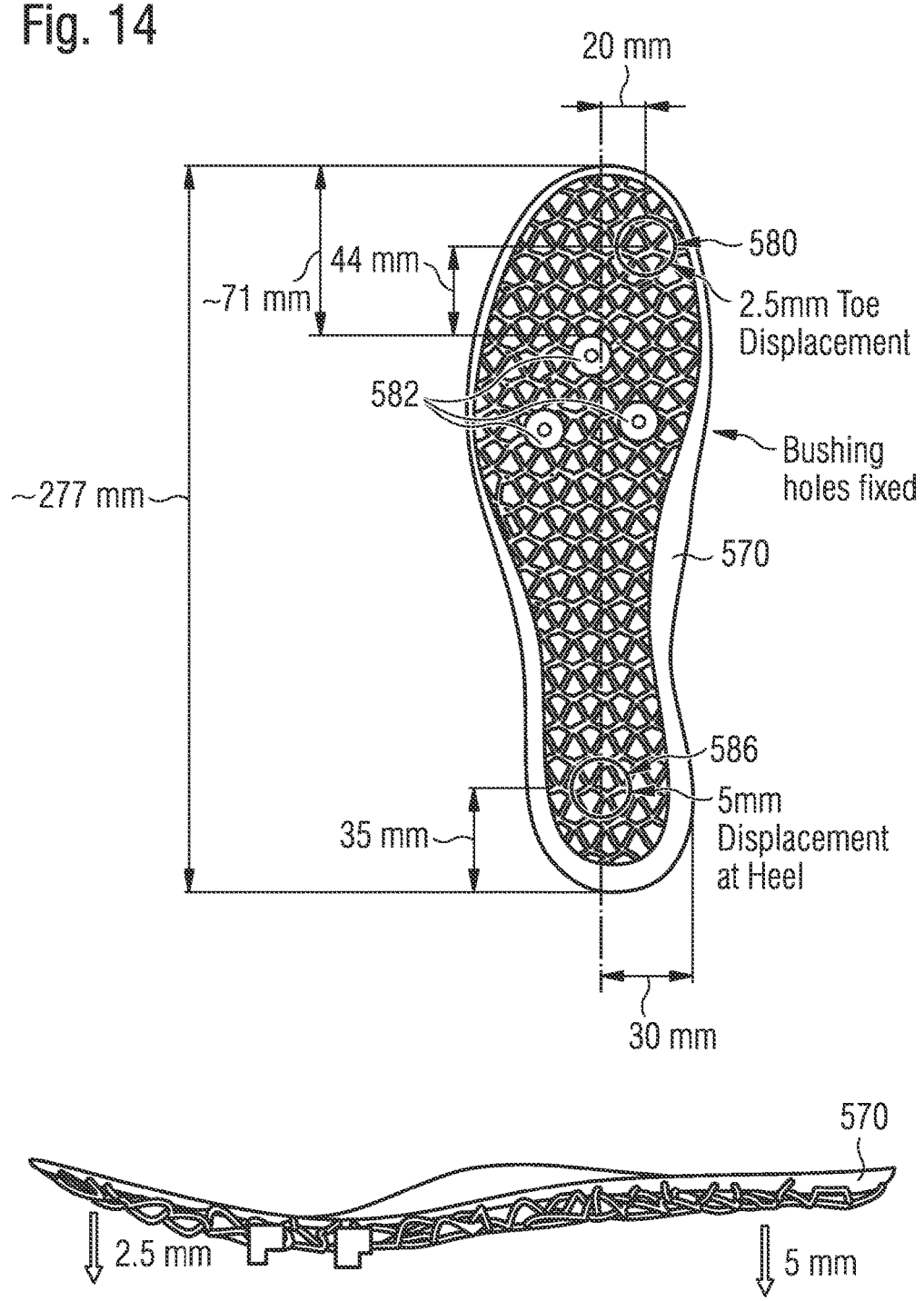
FIG. 14 is an illustration of details on measuring the bending stiffness, according to certain embodiments of the present invention.

Testing for the calibration of the simulation occurred in the following manner. As shown in FIGS. 13-14, sole plate 570 was coupled to rigid cleat 580 at fixation points 582 on the sole and openings 584 on rigid cleat 580. Fixation points 582 may be located in neutral cleat position as indicated. Round indenter 586 and load cell 588 were used to apply a force for a loading time of 1 s to shoe 590. The applied force was controlled such that the sole displaced 2.5 mm in the toe displacement region 592 and 5 mm in the heel displacement region. This loading was repeated for 5 cycles with 2 seconds between cycles. After the fifth cycle the necessary force needed to cause the displacement was measured as the bending stiffness of the plate.

Based on these measurements stiffness of the AlSi10 Mg, 239 plate was determined for two points on a standard UK size 8.5 cycling shoe plate. Specifically, stiffness was determined in toe displacement region 584 and heel displacement region 586 as shown in FIG. 14.

Bending stiffness in a shoe may vary based on position. For example, as depicted in FIG. 14 the bending stiffness of the heel of the cycling plate described above was measured by applying a force to the heel displacement region. Based on these measurements the bending stiffness of the aluminum cycling plate was determined to be approximately 49 N/mm at the heel displacement region and approximately 348 N/mm at the toe displacement region. The weight of the aluminum cycling plate tested was approximately 92 grams. Thus, a ratio of the bending stiffness of the cycling plate to the weight of the cycling plate was approximately, 0.5 N/(g·mm) in the heel displacement region and 3.8 N/(g·mm) in the toe displacement region.

Constructions of a whole or partial sole plate having structures including open lattice work as depicted in FIGS. 1-3 and 8-12 may include a significant benefit for the cooling of feet. The open lattice work as depicted extends to through the sole and provides for significant airflow to the bottom of the foot.

In some embodiments materials for the lattice may be selected to increase heat transfer from the foot to the metal. In some cases, sockliners may be minimized or not worn to increase contact with the lattice to increase the transfer of heat from the foot to the lattice material. In one example, the sockliner may only be provided in the calcaneus and/or metatarsal part of the sole. During use a relative constant flow of air through the lattice allows for cooling and enhances the heat transfer from the foot. Examples for constructing a sockliner providing improved head dissipation properties, which may be used in combination with the lattice, have been discussed above.

In an example a sock liner may be constructed to include thermally conductive materials that increase heat transfer from the foot to the sole plate. This has been described above in further detail.

An example may include bumpers and/cleats having thermally insulating properties to inhibit transfer of heat from the ground to sole or the sole to the ground.

In another example, the sole as described herein may extend upwards into the heel region such that the sole forms a cup to support the heel. For example, a heel portion may include a stiff part formed by additive manufacturing to inhibit movement of the heel within the shoe.

Further, a lattice structure in a sole that is resistant and/or non-porous to water may be of interest to cyclists participating in multisport events such as aquabike races, duathlons, triathlons, etc. A shoe with a lattice sole as described herein could be worn during swimming and then in the cycling portion of the event. The open framework in the sole would allow for increased airflow through the shoe and potentially decrease the drying time of the shoe. This may increase the comfort of the shoe.

As disclosed herein various parts may be constructed using additive manufacturing, for example, plates for soles. In an example, a portion of a sole plate may be constructed using additive manufacturing. For example, a sole plate may be designed such that the lattice and rim are integrally constructed using additive manufacturing. In some cases struts may be formed using conventional methods and coupled on the sole plate using standard methods known in the art.

A further example may include constructing a lattice, rim, and at least one strut proximate a portion of a lattice (e.g., on and/or inside the lattice) using additive manufacturing.

Alternatively, some plates may be constructed having regions integrally formed using additive manufacturing and other regions using conventional methods. For example, the toe region of a sole plate may be constructed using laser sintering while the portion of the sole plate from the instep to the heel may be constructed using methods known in the art. The regions may be coupled to each other using methods known in the art.

Components constructed in this manner may also include metal sintered torsion bars, for example, for a running shoe. In addition, for certain applications metal sintered studs may be used for sprinting, football, American football, basketball, rugby, field hockey, lacrosse, golf or any other application requiring studs. Further, upper components including, but not limited to portions of an upper, heel counters, closure systems, eyelets, and/or parts requiring a specific stiffness may be constructed using additive manufacturing techniques. Upper components constructed in this manner may increase heat transfer from the foot based on the selected materials and/or designs. For example, metal lattice structures may be used proximate areas of the foot where enhanced heat transfer is desired.

In the following, further examples are described to facilitate the understanding of the invention:

1. Sole (100; 200) for a shoe (300), in particular for a cycling shoe (300), comprising:
   a. a three-dimensionally shaped rim (110); and
   b. a plurality of first reinforcing struts (121-127; 221-222), wherein
   c. at least two (122-125; 221-222) of the plurality of first reinforcing struts (121-127; 221-222) extend from a heel region (112) of the rim (110) of the sole (100; 200) to a toe region (115) of the rim (110) of the sole (100; 200), and wherein
   d. the rim (110) of the sole (100; 200) and the plurality of first reinforcing struts (121-127; 221-222) are integrally manufactured as a single piece in an additive manufacturing process.
2. Sole (100; 200) according to the preceding example, wherein at least one (122-125; 221-222) of the first reinforcing struts that extend from the heel region (112) of the rim (110) to the toe region (115) of the rim (110) extends in a smooth S-shape from the heel region (112) of the rim (110) across a bottom side of the sole (100; 200) to the toe region (115) of the rim (100).
3. Sole (100; 200) according to one of the preceding examples, wherein at least two (122-125; 221-222) of the reinforcing struts that extend from the heel region (112) of the rim (100) to the toe region (115) of the rim (100) extend essentially parallel and each in a smooth S-shape from the heel region (112) of the rim (100) across the bottom side of the sole (100; 200) to the toe region (115) of the rim (110).
4. Sole (100; 200) according to one of the preceding examples, wherein the plurality of first reinforcing struts (121-127; 221-222) provides a first reinforcing layer of the sole (100; 200).
5. Sole (110; 200) according to the preceding example, further comprising a plurality of second reinforcing struts (131-135) integrally manufactured with the rest of the sole (100; 200) in the additive manufacturing process and providing a second reinforcing layer.
6. Sole (100; 200) according to the preceding example, wherein one or more first reinforcing struts (121-127; 221-222) in the first reinforcing layer are essentially parallel to one or more corresponding second reinforcing struts (131-135) in the second reinforcing layer.
7. Sole (100; 200) according to the preceding example, wherein two adjacent first reinforcing struts (121-127; 221-222) and their corresponding essentially parallel second reinforcing struts (131-135) are interconnected by a plurality of nodes (140; 240).
8. Sole (100; 200) according to the preceding example, wherein the nodes (140; 240) comprise an X-shaped cross-sectional form in at least one of: a bottom view, a rear view and a side view of the sole (100; 200).
9. Sole (100; 200) according to the preceding example, wherein the nodes (140; 240) comprise an X-shaped cross-sectional form in all three views.
10. Sole (100; 200) according to one of examples 5 to 9, further comprising a lattice structure (180) integrally manufactured with the rim (110), the plurality of first reinforcing struts (121-127; 221-222) and the plurality of second reinforcing struts (131-135) as a single piece in an additive manufacturing process.
11. Sole (100; 200) according to the preceding example, wherein the lattice structure (180) is sandwiched between the plurality of first reinforcing struts (121-127; 221-222) and the plurality of second reinforcing struts (131-135).
12. Sole (100; 200) according to one of examples 10 to 11, wherein the lattice structure (180) comprises the plurality of nodes (140; 240).
13. Sole (100; 200) according to one of examples 10 to 12, wherein the lattice structure (180) comprises a plurality of second nodes (142) and wherein the plurality of first reinforcing struts (121-127; 221-222) and the plurality of second reinforcing struts (131-135) are positioned on the lattice 180 between adjacent ones of the second nodes (142).
14. Sole (100; 200) according to example 13, wherein the nodes (140; 240) and the second nodes (142) are offset, such that the plurality of first reinforcing struts (121-127; 221-222) and the plurality of second reinforcing struts (131-135) are offset from the nodes (140; 240).
15. Sole (100; 200) according to one of the preceding examples, further comprising means (151; 152; 153) for attaching a cleat to the bottom side of the sole (100; 200), which is integrally formed with the first and/or second reinforcing struts (121-127; 131-135; 221-222).
16. Sole (100; 200) according to one of the preceding examples further comprising at least one first bumper element (160; 165; 260; 265) in the toe region and/or in the heel region, arranged between two adjacent first reinforcing struts (121-127; 221-222) and/or two adjacent second reinforcing struts (131-135) and protruding downwardly from the bottom side of the sole (100; 200).
17. Sole (100; 200) according to one of the preceding examples further comprising at least one second bumper element (170) attached to the bottom side of at least one of the first reinforcing struts (121-127; 221-222).
18. Sole (100; 200) according to one of the preceding examples, wherein at least one of the first or second reinforcing struts (121-127; 131-135; 221-222) comprises a T-shaped cross-section.
19. Sole (100; 200) according to one of the preceding examples, wherein the rim (110) is three-dimensionally shaped to support the arch region of the foot.
20. Sole (100; 200) according to one of the preceding examples, wherein the additive manufacturing process comprises a laser sintering of a metal material.
21. Sole (100; 200) according to the preceding example, wherein the metal material comprises AlSi10 Mg, 239 and/or Ti6Al4 V.
22. Sole (100; 200) according to one of the preceding examples, wherein the sole (100; 200) comprises a bending stiffness greater than 40 N/mm in the heel region.
23. Sole (100; 200) according to one of the preceding examples, wherein the sole (100; 200) comprises a bending stiffness greater than 220 N/mm in the toe region.
24. Sole (100; 200) according to one of the preceding examples, wherein the sole (100; 200) comprises a weight smaller than 100 g.
25. Shoe (300), in particular cycling shoe (300), with a sole (100; 200) according to one of the preceding examples 1-24.
26. Shoe (300) according to the preceding examples further comprising an upper (310) attached to the three-dimensionally shaped rim (110).
27. Shoe (300) according to one of the preceding examples 25-26 further comprising a net (190) or a membrane arranged on the top side of the sole (100; 200).
28. Shoe (300) according to the preceding example, wherein the heel portion (320) extends around the ankle of the foot towards the instep of the foot to allow securing the foot within the shoe (300).
29. Shoe (300) according to one of the preceding examples 25-28, further comprising a sockliner (400), wherein the sockliner (400) comprises a woven material layer (410) comprising carbon fibers.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sole for a shoe comprising:
a three-dimensionally shaped rim;
a lattice structure connected to the rim and comprising a plurality of supporting members, wherein the plurality of supporting members converge to form a plurality of first nodes and a plurality of second nodes, wherein a number of supporting members forming each first node is less than a number of supporting members forming each second node, wherein the plurality of second nodes are vertically offset in-between the plurality of first nodes; and
a plurality of first reinforcing struts positioned on at least some of the first nodes of the lattice structure that are vertically offset above the second nodes such that the plurality of first reinforcing struts are vertically offset from the plurality of second nodes of the lattice structure, the plurality of first reinforcing struts forming a first reinforcing layer of the sole;
a plurality of second reinforcing struts positioned on at least some of the first nodes of the lattice structure that are vertically offset below the second nodes such that the plurality of second reinforcing struts are vertically offset from the plurality of second nodes of the lattice structure, the plurality of second reinforcing struts forming a second reinforcing layer of the sole;
wherein at least one of the plurality of first reinforcing struts in the first reinforcing layer extends from a heel region of the rim to a toe region of the rim and is essentially parallel to a corresponding one of the plurality of second reinforcing struts that extends from the heel region of the rim to the toe region of the rim;
wherein a thickness of at least one first reinforcing strut is varied along a length of the at least one first reinforcing strut;
wherein a second of the plurality of first reinforcing struts extends from the heel region of the rim of the sole to the toe region of the rim of the sole; and
wherein the rim of the sole and the plurality of first reinforcing struts are integrally manufactured as a single piece.

2. The sole according to claim 1, wherein the plurality of first reinforcing struts cannot be decoupled from the rim of the sole without destruction of one of the plurality of first reinforcing struts and the rim of the sole.

3. The sole according to claim 1, wherein at least one of the plurality of first reinforcing struts that extend from the heel region of the rim to the toe region of the rim extends in a smooth S-shape from the heel region of the rim across a bottom side of the sole to the toe region of the rim.

4. The sole according to claim 1, wherein the at least two of the plurality of first reinforcing struts that extend from the heel region of the rim to the toe region of the rim extend essentially parallel and each in a smooth S-shape from the heel region of the rim across a bottom side of the sole to the toe region of the rim.

5. The sole according to claim 1, wherein the plurality of second reinforcing struts are integrally manufactured with the rim and the plurality of first reinforcing struts.

6. The sole according to claim 1, wherein each first node of the plurality of first nodes and each second node of the plurality of second nodes each comprises an X-shaped cross-sectional form in at least one of: a bottom view, a rear view and a side view of the sole.

7. The sole according to claim 6, wherein each first node of the plurality of first nodes and each second node of the plurality of second nodes comprises the X-shaped cross-sectional form in all three views.

8. The sole according to claim 5, wherein the lattice structure is integrally manufactured with the rim, the plurality of first reinforcing struts, and the plurality of second reinforcing struts as a single piece.

9. The sole according to claim 8, wherein the lattice structure is sandwiched between the plurality of first reinforcing struts and the plurality of second reinforcing struts.

10. The sole according to claim 9, wherein the plurality of first reinforcing struts and the plurality of second reinforcing struts are positioned on the lattice structure between adjacent ones of the plurality of second nodes.

11. The sole according to claim 10, wherein the plurality of first nodes and the plurality of second nodes are horizontally offset such that the plurality of first reinforcing struts and the plurality of second reinforcing struts are horizontally and vertically offset from the plurality of second nodes.

12. The sole according to claim 5, further comprising an attachment mechanism for coupling a cleat to a bottom side of the sole, which is integrally formed with the at least one of the first reinforcing struts or the second reinforcing struts.

13. The sole according to claim 5, further comprising at least one first bumper element in at least one of the toe region and the heel region, wherein the at least one first bumper is arranged between at least two adjacent first reinforcing struts or two adjacent second reinforcing struts and protruding downwardly from a bottom side of the sole.

14. The sole according to claim 13, further comprising at least one second bumper element attached to a bottom side of at least one of the plurality of first reinforcing struts.

15. The sole according to claim 5, wherein at least one of the first or second reinforcing struts comprises a T-shaped cross-section.

16. The sole according to claim 1, wherein the rim is three-dimensionally shaped to support an arch region of a wearer's foot when worn.

17. The sole according to claim 1, wherein the sole comprises a bending stiffness greater than 40 N/mm in the heel region.

18. The sole according to claim 1, wherein the sole comprises a bending stiffness greater than 220 N/mm in the toe region.

19. The sole according to claim 1, wherein the sole comprises a weight smaller than 100 g.

20. The sole according to claim 1, wherein the rim of the sole and the plurality of first reinforcing struts are formed of a metal material laser sintered as a single piece.

21. The sole according to claim 20, wherein the metal material comprises AlSi10Mg, 239 and/or Ti6Al4 V.

22. A shoe with a sole according to claim 1.

23. The shoe according to claim 22, further comprising an upper attached to the three-dimensionally shaped rim.

24. The shoe according to claim 22, further comprising a net or a membrane arranged on a top side of the sole.

25. The shoe according to claim 24, wherein a heel portion extends around an ankle of a wearer's foot towards an instep of the foot when worn to allow securing the foot within the shoe.

26. The shoe according to claim 22, further comprising a sockliner, wherein the sockliner comprises a woven material layer comprising carbon fibers.

27. A method of manufacturing a sole of a shoe comprising:

providing a non-planar rim and a lattice structure, the lattice structure comprising a plurality of supporting members, wherein the plurality of supporting members converge to form a plurality of first nodes and a plurality of second nodes, wherein a number of supporting members forming each first node is less than a number of supporting members forming each second node, and wherein the plurality of second nodes are vertically offset in-between the plurality of first nodes; and integrally forming the rim of the sole with a plurality of first reinforcing struts and a plurality of second reinforcing struts utilizing an additive manufacturing process, wherein integrally forming the rim of the sole with the plurality of first reinforcing struts and the plurality of second reinforcing struts comprises:

positioning the plurality of first reinforcing struts on at least some of the first nodes that are vertically offset above the plurality of second nodes such that the plurality of first reinforcing struts are vertically apart from the plurality of second nodes and form a first reinforcing layer of the sole; and positioning the plurality of second reinforcing struts on at least some of the first nodes that are vertically offset below the plurality of second nodes such that the plurality of second reinforcing struts are vertically apart from the plurality of second nodes and form a second reinforcing layer of the sole, wherein at least one of the plurality of first reinforcing struts in the first reinforcing layer extends from a heel region of the rim to a toe region of the rim and is essentially parallel to a corresponding one of the plurality of second reinforcing struts that extends from the heel region of the rim to the toe region of the rim.

28. The method of claim 27, further comprising manufacturing the non-planar rim, wherein manufacturing the non-planar rim comprises:

providing an electronic data file comprising at least one design for a three-dimensionally shaped rim comprising the plurality of first reinforcing struts;

constructing the three-dimensionally shaped rim comprising the plurality of first reinforcing struts using an additive manufacturing method; and post-process treating the three-dimensionally shaped rim comprising the plurality of first reinforcing struts.

29. The method of claim 28, wherein the electronic data file is a CAD file.

* * * * *